(12) United States Patent  
Hommi et al.

(10) Patent No.: US 7,091,678 B2  
(45) Date of Patent: Aug. 15, 2006

(54) DEVICE AND METHOD FOR CONTROLLING PRIME MOVER

(75) Inventors: Akira Hommi, Aichi-ken (JP); Kiyotaka Hamajima, Okazaki (JP); Mitsuhiro Nada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/525,870

(22) PCT Filed: Jul. 7, 2003

(86) PCT No.: PCT/JP03/08592

§ 371 (c)(1),
(2), (4) Date: Feb. 25, 2005

(87) PCT Pub. No.: WO2004/022380

PCT Pub. Date: Mar. 18, 2004

(65) Prior Publication Data

US 2005/0258785 A1   Nov. 24, 2005

(30) Foreign Application Priority Data

Aug. 29, 2002  (JP)  ............... 2002-251362

(51) Int. Cl.
*B61C 15/08*  (2006.01)
*B61C 15/12*  (2006.01)

(52) U.S. Cl. .................. 318/52; 318/68; 318/93; 318/373; 318/375

(58) Field of Classification Search ............ 318/52, 318/68, 93, 138, 254, 439, 373, 375, 700–800
See application file for complete search history.

(56) References Cited

U.S. PATENT DOCUMENTS 3,260,555 A * 7/1966 Packer ................. 303/189

(Continued)

FOREIGN PATENT DOCUMENTS

JP          58-033902          2/1983

(Continued)

OTHER PUBLICATIONS

Japanese language version of Japanese Office Action No. JP 2002-251362, issued Jan. 20, 2006.

(Continued)

*Primary Examiner*—Marlon T. Fletcher
*Assistant Examiner*—Tyrone Smith
(74) *Attorney, Agent, or Firm*—Kenyon & Kenyon LLP

(57) ABSTRACT

When an angular acceleration α of a rotating shaft of a motor connected with a drive shaft exceeds a preset threshold value αslip, which suggests the occurrence of a skid, the torque control procedure sets a maximum torque Tmax by referring to a map, which gives a smaller maximum torque Tmax with an increase in angular acceleration α, and restricts the motor torque to the maximum torque Tmax. The maximum torque Tmax is fixed to a value corresponding to a peak value of the angular acceleration α at the time of occurrence of a skid. The torque control procedure then integrates the angular acceleration α to give a time integration thereof over an integration interval when the angular acceleration α once exceeds the preset threshold value αslip and decreases again below the preset threshold value αslip by the motor torque restriction. When the motor torque restriction practically converges the skid, the torque restricted to the maximum torque Tmax corresponding to the peak value of the angular acceleration α is restored to the new setting of the maximum torque Tmax corresponding to the time integration of the angular acceleration α.

22 Claims, 18 Drawing Sheets

U.S. PATENT DOCUMENTS

| | | | | |
|---|---|---|---|---|
| 3,312,509 A | * | 4/1967 | Highley | 303/115.3 |
| 3,658,388 A | * | 4/1972 | Hasegawa | 303/171 |
| 4,280,740 A | * | 7/1981 | Ohmori et al. | 303/122.06 |
| 4,446,522 A | * | 5/1984 | Sato et al. | 701/79 |
| 4,789,938 A | * | 12/1988 | Maehata et al. | 701/76 |
| 5,134,352 A | * | 7/1992 | Matsumoto et al. | 318/587 |
| 5,195,037 A | * | 3/1993 | Tezuka | 701/81 |
| 5,375,919 A | * | 12/1994 | Furuhashi | 303/119.1 |
| 5,433,513 A | * | 7/1995 | Takayama | 303/167 |
| 5,788,345 A | * | 8/1998 | Sakane et al. | 303/146 |
| 5,898,281 A | * | 4/1999 | Bossoney et al. | 318/52 |
| 6,473,683 B1 | * | 10/2002 | Nada | 701/82 |

FOREIGN PATENT DOCUMENTS

| | | |
|---|---|---|
| JP | 62-060402 | 3/1987 |
| JP | 62-197650 | 9/1987 |
| JP | 08-158905 | 6/1996 |
| JP | 08-182119 | 7/1996 |
| JP | 10-304514 | 11/1998 |
| JP | 2000-134714 | 5/2000 |
| JP | 2001-025110 | 1/2001 |
| JP | 2001-295676 | 10/2001 |

OTHER PUBLICATIONS

English translation of Japanese Office Action NO. JP 2002-251362, issued Jan. 20, 2006.

* cited by examiner

FIG.10
(a) Time Point t3
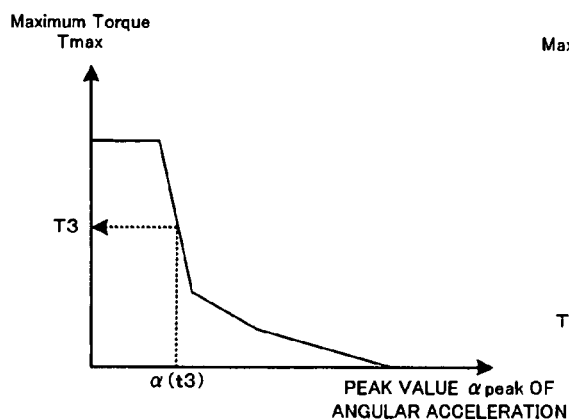
(b) Time Point t5 to Time Point t10
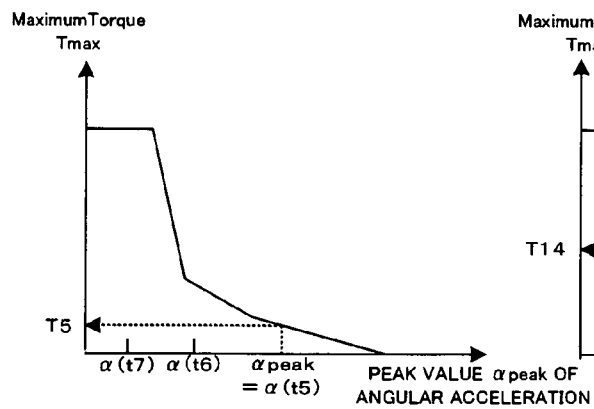
(c) Time Point t11 to Time Point t13
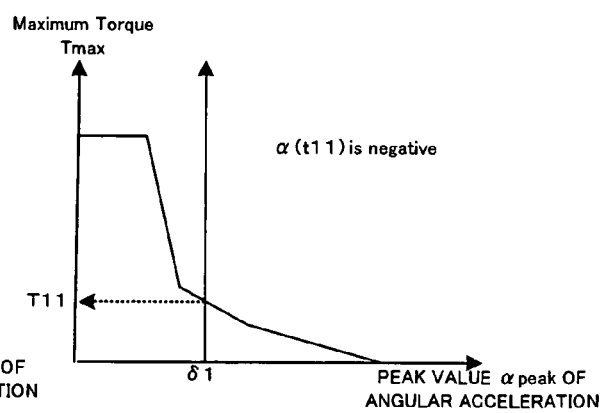
(d) After Time Point t14
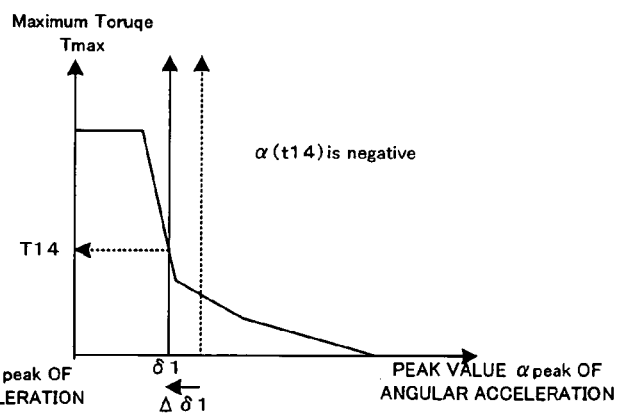

FIG.15
(a) Time Point t5
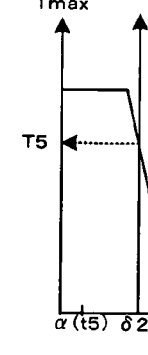
(b) Time Point t12
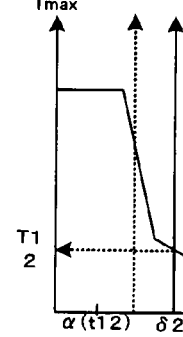
(c) Time Point t17
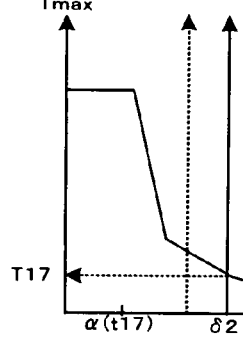
(d) Time Point t18
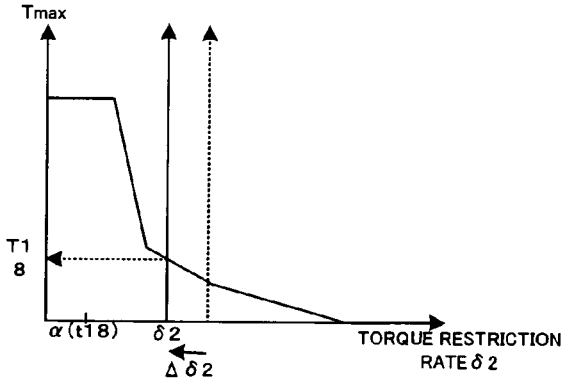

DEVICE AND METHOD FOR CONTROLLING PRIME MOVER

This is a 371 national phase application of PCT/JP2003/008592 filed 7 Jul. 2003, claiming priority to Japanese Patent Application Ser. No. 2002-251362 filed 29 Aug. 2002, the contents of which are incorporated herein by reference.

TECHNICAL FIELD

The present invention relates to a motor control apparatus and a motor control method. More specifically the invention pertains to a motor control apparatus that controls a motor, which is mounted on a vehicle and outputs power to a drive shaft linked to drive wheels, as well as to a corresponding motor control method.

BACKGROUND ART

One proposed motor control apparatus restricts torque output from a motor to a drive shaft, in response to occurrence of a skid due to wheelspin of drive wheels with the torque output from the motor (see, for example, Japanese Patent Laid-Open Gazette No. 10-304514). This prior art motor control apparatus detects the occurrence of a skid when an angular acceleration (a time variation of angular velocity) of the drive wheels exceeds a preset threshold value, and lowers the torque output from the motor to reduce the skid.

The applicant of the present invention has previously proposed a technique to prevent such repetition of the occurrence and convergence of skids. This proposed technique restricts the torque output from a motor when the angular acceleration of drive wheels exceeds a preset threshold value, and relieves the torque restriction when the torque restriction lowers the angular acceleration below the preset threshold value and a predetermined cancellation condition is fulfilled (for example, when the vehicle speed is not higher than a preset level) (see Japanese Patent Laid-Open Gazette No. 2001-295676).

DISCLOSURE OF THE INVENTION

The motor control apparatus and the corresponding motor control method of the invention aim to eliminate the drawbacks of the prior art and effectively prevent repeated occurrence and convergence of skids. The motor control apparatus and the motor control method of the invention also aim to control the torque output to the drive shaft to an adequate level according to the skid state without excessive torque restriction.

At least part of the above and the other related objects is attained by the motor control apparatus and the corresponding motor control method of the invention having the arrangements discussed below.

A motor control apparatus of the invention drives and controls a motor, which is mounted on a vehicle and outputs power to a drive shaft linked to drive wheels, and the motor control apparatus includes: an angular acceleration measurement module that measures an angular acceleration of either of the drive shaft and a rotating shaft of the motor; a first skid detection module that detects a skid due to wheelspin of the drive wheels, based on the measured angular acceleration; a first torque restriction control module that, in response to detection of a skid by the first skid detection module, restricts torque output and controls the motor with the restricted torque output, so as to reduce the skid; a first integration module that integrates the angular acceleration, which is measured by the angular acceleration measurement module, to give a time integration thereof since detection of the skid by the first skid detection module; and a first torque restoration control module that, in response to at least a reducing tendency of the skid, restores the torque output, which is restricted by the first torque restriction control module, according to the time integration of the angular acceleration given by the first integration module and controls the motor with the restored torque output.

In response to detection of a skid due to wheelspin of the drive wheels based on the measured angular acceleration of the drive shaft or the rotating shaft, the motor control apparatus of the invention restricts the torque output and controls the motor with the restricted torque output, in order to reduce the skid. The motor control apparatus integrates the angular acceleration to give the time integration thereof since detection of the skid. In response to at least a reducing tendency of the skid, the motor control apparatus restores the restricted torque output according to the time integration of the angular acceleration and controls the motor with the restored torque output. It is expected that the time integration of the angular acceleration since detection of the skid reflects the skid state. The restoration of the torque output, which was restricted under the occurrence of the skid, according to the time integration of the angular acceleration, in response to at least a reducing tendency of the skid, effectively prevents the occurrence of another skid.

In one preferable embodiment of the motor control apparatus of the invention, the first skid detection module may compare the angular acceleration measured by the angular acceleration measurement module with a preset threshold value to detect a skid, and the first integration module may integrate the angular acceleration over an integration interval when the measured angular acceleration once exceeds the preset threshold value and decreases again below the preset threshold value. The motor control apparatus of this embodiment accurately perceives the current skid state and restores the restricted torque output.

In another preferable embodiment of the motor control apparatus of the invention, the first torque restoration control module may vary a degree of restoration of the restricted torque output according to the time integration of the angular acceleration and control the motor with the varied degree of the restored torque output. In the motor control apparatus of this embodiment, the first torque restoration control module may control the motor with a lower degree of restoration of the restricted torque output against an increase in time integration of the angular acceleration. The motor control apparatus of this embodiment sets a lower degree of restoration of the restricted torque output in response to a greater time integration of the angular acceleration of the drive shaft, which suggests a higher potential for occurrence of another skid, while setting a higher degree of restoration of the restricted torque output in response to a smaller time integration of the angular acceleration of the drive shaft, which suggests a lower potential for occurrence of another skid. This arrangement ensures restoration of the restricted torque output to an adequate level to prevent the occurrence of another skid. Moreover, in the motor control apparatus of this embodiment, the first torque restoration control module may set a maximum torque in restoration of the restricted torque output based on the time integration of the angular acceleration and control the motor with the setting of the maximum torque as an upper limit.

In still another preferable embodiment of the motor control apparatus of the invention, the first torque restoration control module may restore the restricted torque output, in response to continuous measurement of a negative level of the angular acceleration for a preset time period by the angular acceleration measurement module, and control the motor with the restored torque output.

Moreover, in another preferable embodiment of the motor control apparatus of the invention, the first torque restriction control module may vary a degree of restriction of the torque output according to the measured angular acceleration and control the motor with the varied degree of the restricted torque output. The motor control apparatus of this embodiment effectively restricts the torque output from the motor according to the degree of the skid. In the motor control apparatus of this embodiment, the first torque restriction control module may control the motor with a higher degree of restriction of the torque output against an increase in measured angular acceleration. In the motor control apparatus of this embodiment, the first torque restriction control module may set a maximum torque in restriction of the torque output based on the measured angular acceleration and control the motor with the setting of the maximum torque as an upper limit.

Further, in another preferable embodiment of the motor control apparatus of the invention, the vehicle may have driven wheels that are driven by the drive wheels. The motor control apparatus of this embodiment may further include a drive wheel rotation speed measurement module that measures a rotation speed of the drive wheels; a driven wheel rotation speed measurement module that measures a rotation speed of the driven wheels; a second skid detection module that detects a skid due to wheelspin of the drive wheels, based on a wheel speed difference between the measured rotation speed of the drive wheels and the measured rotation speed of the driven wheels; and a second torque restriction control module that, in response to detection of a skid by the second skid detection module, restricts the torque output and controls the motor with the restricted torque output, so as to reduce the skid. The motor control apparatus of this embodiment detects a skid, which is not detectable by a variation in angular acceleration of the drive shaft, based on the wheel speed difference between the rotation speed of the drive wheels and the rotation speed of the driven wheels and reduces the detected skid.

In one preferable embodiment of the motor control apparatus of the invention that is designed to detect a skid based on the wheel speed difference between the rotation speed of the drive wheels and the rotation speed of the driven wheels, the motor control apparatus further includes a second integration module that integrates the wheel speed difference between the measured rotation speed of the drive wheels and the measured rotation speed of the driven wheels to give a time integration thereof since detection of the skid by the second skid detection module. The second torque restriction control module restricts the torque output according to the time integration of the wheel speed difference and controls the motor with the restricted torque output. The motor control apparatus of this embodiment accurately perceives the degree of the skid according to the time integration of the wheel speed difference and thus adequately restricts the torque output from the motor. In the motor control apparatus of this embodiment, the second skid detection module may compare the wheel speed difference with a preset threshold value to detect a skid, and the second torque restriction control module may restrict the torque output according to the time integration of the wheel speed difference since an increase in wheel speed difference over the preset threshold value and control the motor with the restricted torque output. Further, in the motor control apparatus of the invention, the second torque restriction control module may vary a degree of restriction of the torque output according to the time integration of the wheel speed difference and control the motor with the varied degree of the restricted torque output. This arrangement effectively restricts the torque output from the motor according to the degree of the skid. In the motor control apparatus of the invention, the second torque restriction control module may control the motor with a higher degree of restriction of the torque output against an increase in time integration of the wheel speed difference.

In one preferable embodiment of the motor control apparatus of the invention that is designed to compare the wheel speed difference between the rotation speed of the drive wheels and the rotation speed of the driven wheels with a preset threshold value to detect a skid, the motor control apparatus further includes a second torque restoration control module that, when a result of the comparison by the second skid detection module shows that the wheel speed difference decreases below the preset threshold value, restores the torque output restricted by the second torque restriction control module and controls the motor with the restored torque output. This arrangement effectively prevents the occurrence of another skid.

A motor control method of the invention drives and controls a motor, which is mounted on a vehicle and outputs power to a drive shaft linked to drive wheels, and the motor control method include the steps of: (a) measuring an angular acceleration of either of the drive shaft and a rotating shaft of the motor; (b) detecting a skid due to wheelspin of the drive wheels, based on the measured angular acceleration; (c) in response to detection of a skid by the step (b), restricting torque output and controlling the motor with the restricted torque output so as to reduce the skid; (d) integrating the angular acceleration, which is measured by the step (a), to give a time integration thereof since detection of the skid by the step (b); and (e) in response to at least a reducing tendency of the skid, restoring the torque output, which is restricted by the step (c), according to the time integration of the angular acceleration given by the step (d) and controlling the motor with the restored torque output.

In one preferable embodiment of the motor control method of the invention, the step (b) may compare the angular acceleration measured by the step (a) with a preset threshold value to detect a skid, and the step (d) may integrate the angular acceleration over an integration interval when the measured angular acceleration once exceeds the preset threshold value and decreases again below the preset threshold value.

In another preferable embodiment of the motor control method of the invention, the step (e) may vary a degree of restoration of the torque output restricted by the step (c) according to the time integration of the angular acceleration and controls the motor with the varied degree of the restored torque output. In the motor control method of this embodiment, the step (e) may control the motor with a lower degree of restoration of the restricted torque output against an increase in time integration of the angular acceleration. Further, in the motor control method of this embodiment, the step (e) may set a maximum torque in restoration of the restricted torque output based on the time integration of the angular acceleration and control the motor with the setting of the maximum torque as an upper limit.

In still another preferable embodiment of the motor control method of the invention, the step (e) may restore the restricted torque output, in response to continuous measurement of a negative level of the angular acceleration for a preset time period by the step (a), and control the motor with the restored torque output.

The technique of the invention is not restricted to the motor control apparatus or the corresponding motor control method discussed above, but may also be actualized by a vehicle equipped with a motor and the motor control apparatus of the invention.

BRIEF DESCRIPTION OF THE DRAWINGS

FIG. 10 shows settings of the maximum torque Tmax of the motor 12 against the angular acceleration α;

FIG. 15 shows settings of the maximum torque Tmax of the motor 12 against time integration of the wheel speed difference ΔV;

BEST MODES OF CARRYING OUT THE INVENTION

Figure 1:
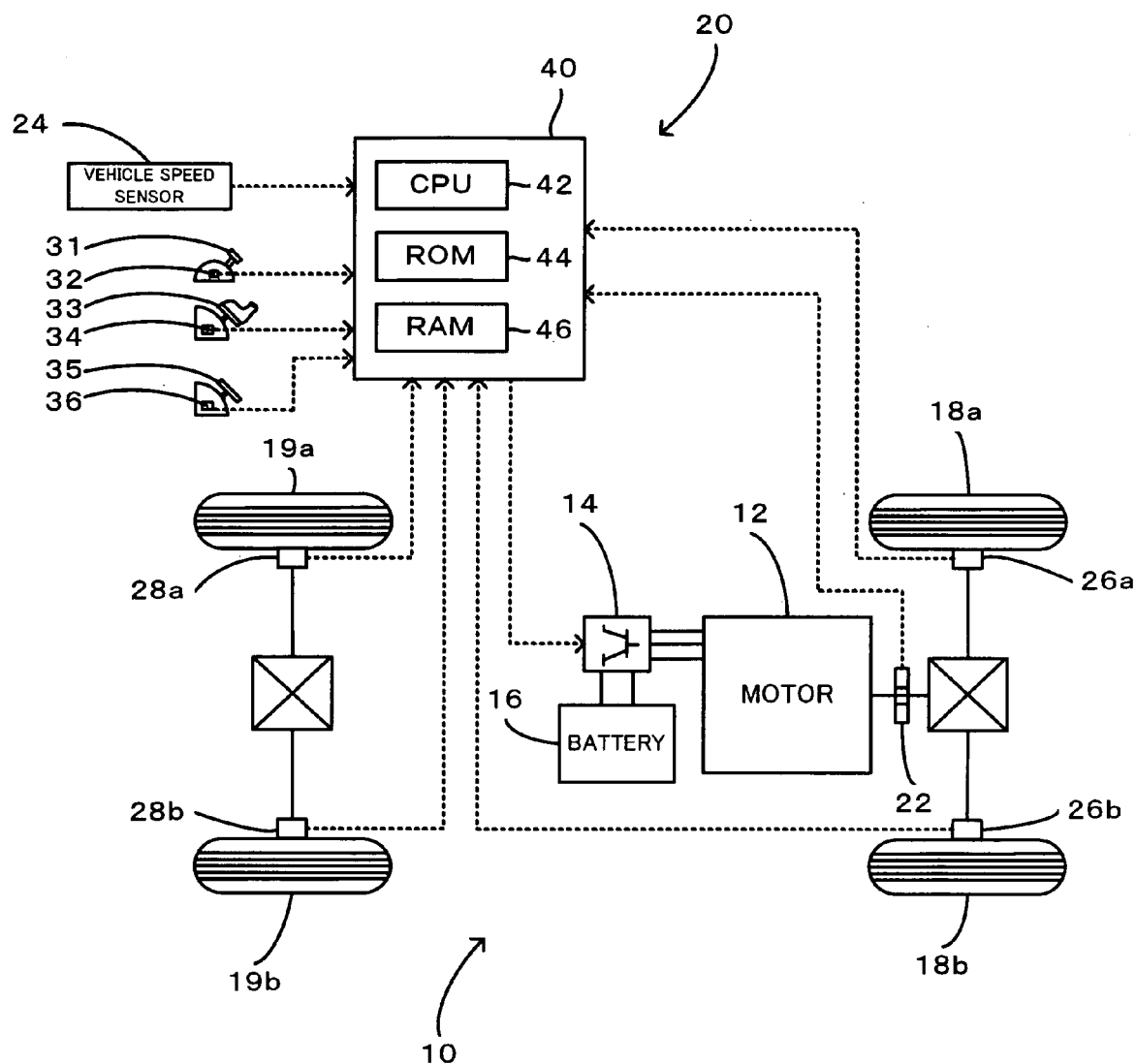
FIG. 1 schematically illustrates the configuration of an electric vehicle 10 equipped with a motor control apparatus 20 in one embodiment of the invention.

One mode of carrying out the invention is described below as a preferred embodiment. FIG. 1 schematically illustrates the configuration of an electric vehicle 10 equipped with a motor control apparatus 20 in one embodiment of the invention. As illustrated, the motor control apparatus 20 of the embodiment is constructed to drive and control a motor 12, which uses electric power supplied from a battery 16 via an inverter circuit 14 and outputs power to a drive shaft linked to drive wheels 18a, 18b of the electric vehicle 10. The motor control apparatus 20 includes a rotation angle sensor 22 that measures a rotation angle θ of a rotating shaft of the motor 12, a vehicle speed sensor 24 that measures a driving speed of the vehicle 10, wheel speed sensors 26a, 26b, 28a, and 28b that respectively measure wheel speeds of the drive wheels (front wheels) 18a and 18b and driven wheels (rear wheels) 19a and 19b driven by the drive wheels 18a and 18b, diversity of sensors that detect the driver's various operations (for example, a gearshift position sensor 32 that detects the driver's setting position of a gearshift lever 31, an accelerator pedal position sensor 34 that detects the driver's step-on amount of an accelerator pedal 33 (an accelerator opening), and a brake pedal position sensor 36 that detects the driver's step-on amount of a brake pedal 35 (a brake opening)), and an electronic control unit 40 that controls the respective constituents of the apparatus.

The motor 12 is, for example, a known synchronous motor generator that functions both as a motor and a generator. The inverter circuit 14 includes multiple switching elements that convert a supply of electric power from the battery 16 into another form of electric power suitable for actuation of the motor 12. The structures of the motor 12 and the inverter circuit 14 are well known in the art and are not the key part of this invention, thus not being described here in detail.

The electronic control unit 40 is constructed as a microprocessor including a CPU 42, a ROM 44 that stores processing programs, a RAM 46 that temporarily stores data, and input and output ports (not shown). The electronic control unit 40 receives, via the input port, the rotation angle θ of the rotating shaft of the motor 12 measured by the rotation angle sensor 22, the vehicle speed V of the vehicle 10 measured by the vehicle speed sensor 24, the wheel speeds Vf1 and Vf2 of the drive wheels 18a and 18b and the wheel speeds Vr1 and Vr2 of the driven wheels 19a and 19b measured by the wheel speed sensors 26a, 26b, 28a, and 28b, the gearshift position detected by the gearshift position sensor 32, the accelerator opening Acc detected by the accelerator pedal position sensor 34, and the brake opening detected by the brake pedal position sensor 36. The electronic control unit 40 outputs control signals, for example, switching control signals to the switching elements of the inverter circuit 14 to drive and control the motor 12, via the output port.

Figure 2:
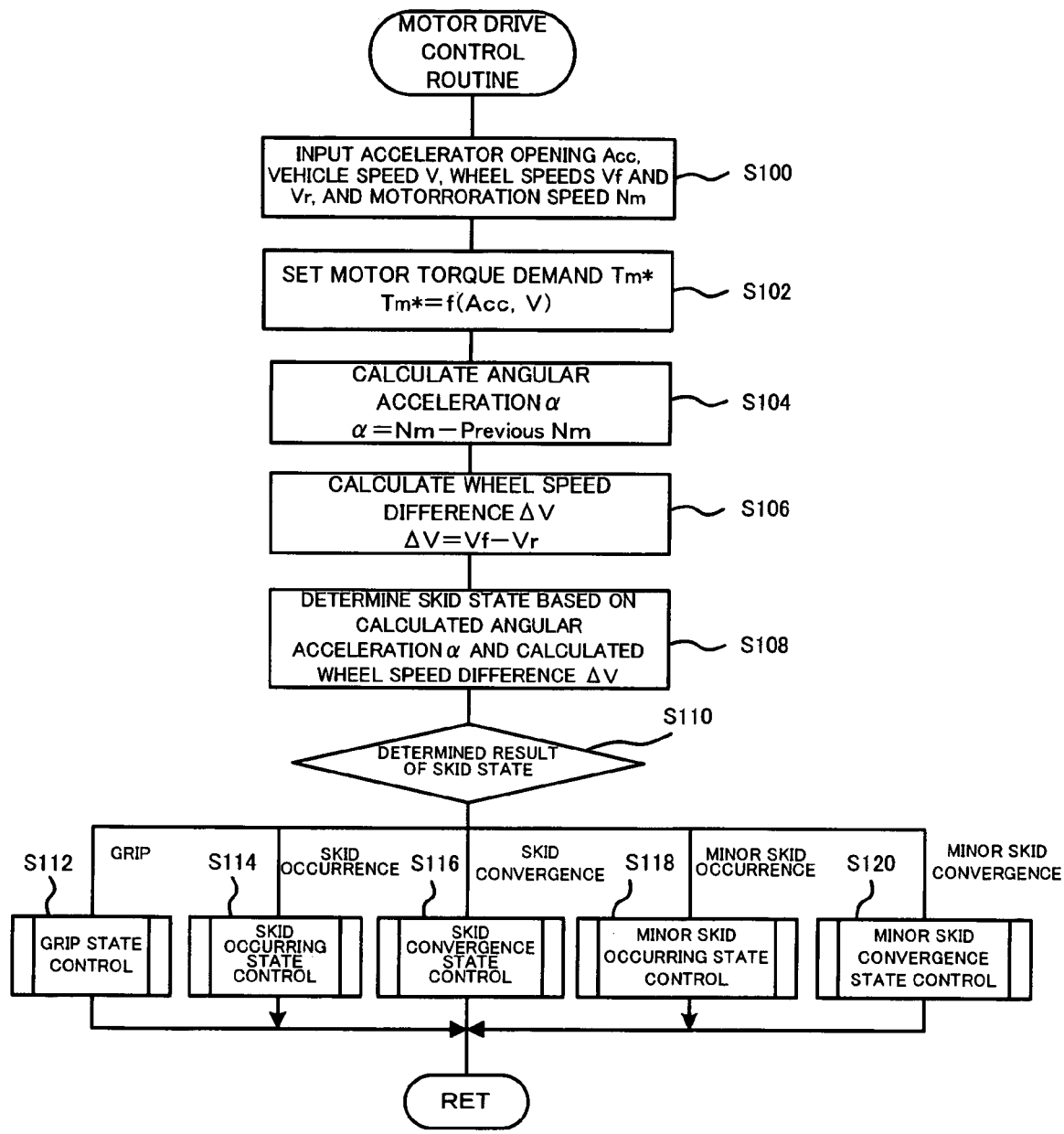
FIG. 2 is a flowchart showing a motor drive control routine executed by an electronic control unit 40 in the motor control apparatus 20 of the embodiment.

The description regards the operations of the motor control apparatus 20 constructed as discussed above, especially a series of operations of driving and controlling the motor 12 in the event of occurrence of a skid due to wheelspin of the drive wheels 18a and 18b of the vehicle 10. FIG. 2 is a flowchart showing a motor drive control routine executed by the electronic control unit 40 in the motor control apparatus 20 of the embodiment. This control routine is repeatedly executed at preset time intervals (for example, at every 8 msec).

When the motor drive control routine starts, the CPU 42 of the electronic control unit 40 first inputs the accelerator opening Acc from the accelerator pedal position sensor 34, the vehicle speed V from the vehicle speed sensor 24, wheel speeds Vf and Vr from the wheel speed sensors 26a, 26b, 28a, and 28b, and a motor rotation speed Nm calculated from the rotation angle θ measured by the rotation angle sensor 22 (step S100). In this embodiment, the wheel speeds Vf and Vr respectively represent an average of the wheel speeds Vf1 and Vf2 measured by the wheel speed sensors 26a and 26b and an average of the wheel speeds Vr1 and Vr2 measured by the wheel speed sensors 28a and 28b. The vehicle speed V is measured by the vehicle speed sensor 24 in this embodiment, but may alternatively be calculated from the wheel speeds Vf1, Vf2, Vr1, and Vr2 measured by the wheel speed sensors 26a, 26b, 28a, and 28b.

Figure 3:
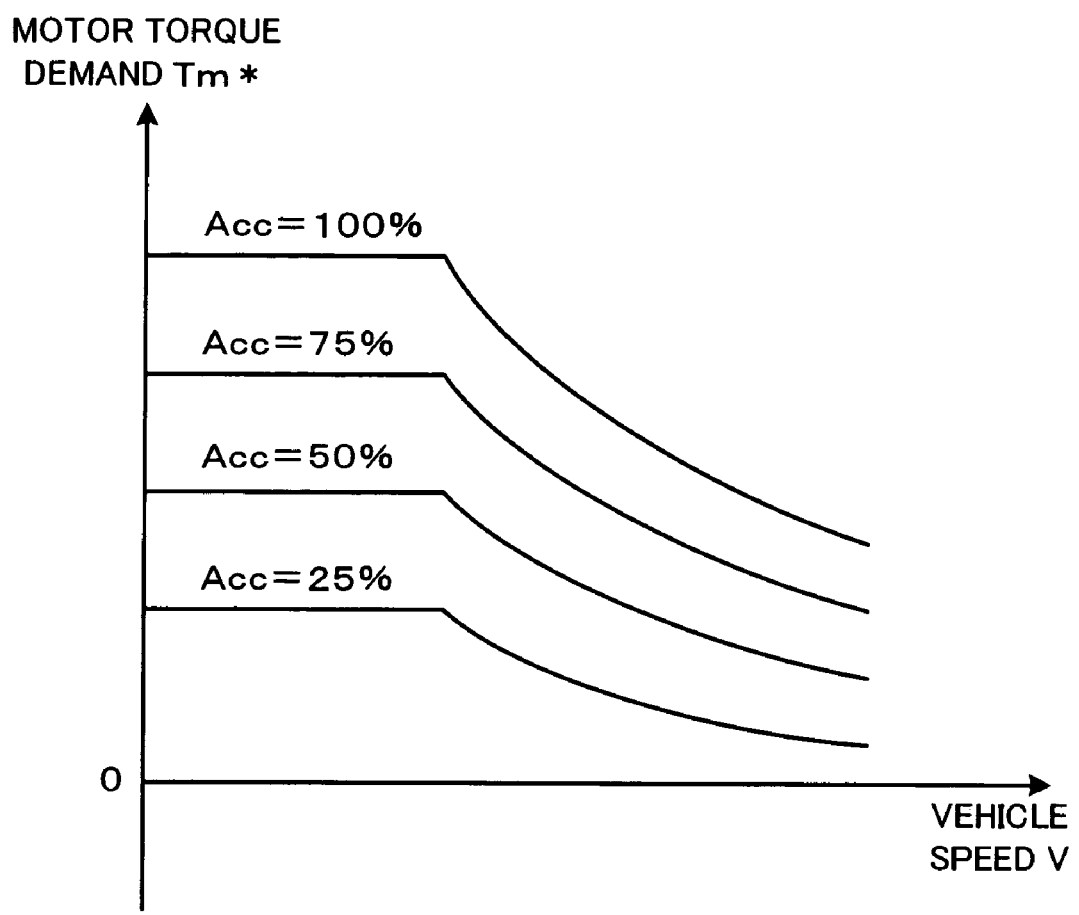
FIG. 3 is a map showing variations in motor toque demand Tm* against vehicle speed V and accelerator opening Acc.

The CPU 42 then sets a torque demand Tm* of the motor 12 according to the input accelerator opening Acc and the input vehicle speed V (step S102). A concrete procedure of setting the motor torque demand Tm* in this embodiment stores in advance variations in motor torque demand Tm* against the accelerator opening Acc and the vehicle speed V as a map in the ROM 44 and reads the motor torque demand Tm* corresponding to the given accelerator opening Acc and the given vehicle speed V from the map. One example of this map is shown in FIG. 3.

The CPU 42 subsequently calculates an angular acceleration α from the motor rotation speed Nm input at step S100 (step S104) and a wheel speed difference ΔV from the average wheel speeds Vf and Vr input at step S100 (step S106). The calculation of the angular acceleration α in this embodiment subtracts a previous rotation speed Nm input in a previous cycle of this routine from a current rotation speed Nm input in the current cycle of this routine (current rotation speed Nm−previous rotation speed Nm). The calculation of the wheel speed difference ΔV in this embodiment subtracts the average Vr of the wheel speeds Vr1 and Vr2 from the average Vf of the wheel speeds Vf1 and Vf2 (Vf−Vr). The unit of the angular acceleration α is [rpm/8 msec] since the execution interval of this routine is 8 msec in this embodiment, where the rotation speed Nm is expressed by the number of rotations per minute [rpm]. Any other suitable unit may be adopted for the angular acceleration α as long as the angular acceleration α is expressible as a time variation of rotation speed. In order to minimize potential errors, the angular acceleration α and the wheel speed difference ΔV may be an average of angular accelerations and an average of wheel speed differences calculated in a preset number of cycles of this routine (for example, 3).

Figure 4:
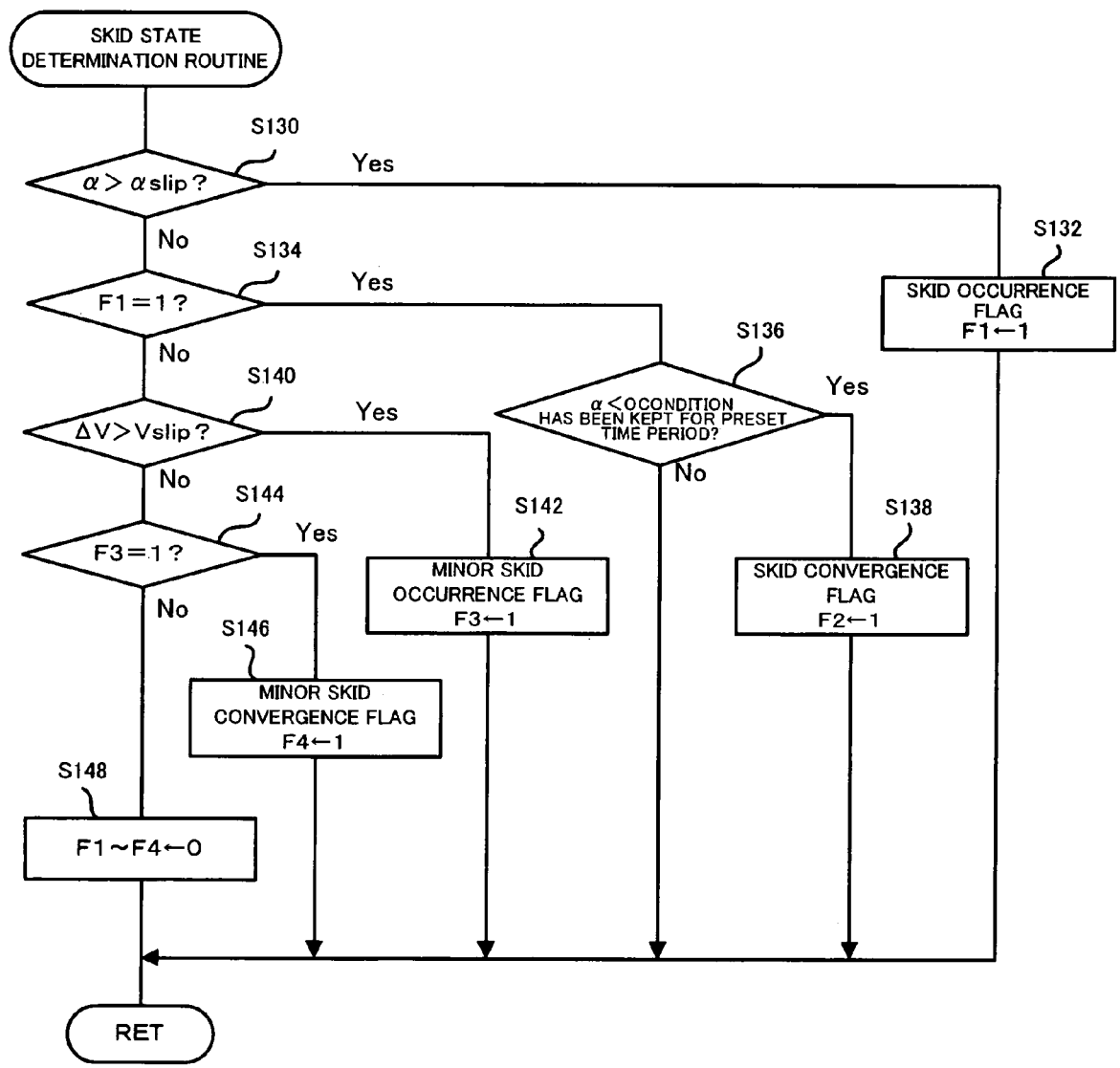
FIG. 4 is a flowchart showing a skid state determination routine executed by the electronic control unit 40 in the motor control apparatus 20 of the embodiment.

The CPU 42 determines a skid state of the drive wheels 18a and 18b, based on the calculated angular acceleration α and the calculated wheel speed difference ΔV (step S108). The determination of the skid state follows a skid state determination routine shown in FIG. 4. The description of the motor drive control routine of FIG. 2 is suspended, and the skid state determination routine of FIG. 4 is described first. When the skid state determination routine starts, the CPU 42 of the electronic control unit 40 compares the angular acceleration α calculated at step S104 in the control routine of FIG. 2 with a preset threshold value αslip, which suggests the occurrence of a skid due to wheelspin (step S130). When the calculated angular acceleration α exceeds the preset threshold value αslip, the CPU 42 determines the occurrence of a skid on the wheels 18a and 18b and sets the value '1' to a skid occurrence flag F1 representing the occurrence of a skid (step S132), before exiting from this skid state determination routine. When the calculated angular acceleration α does not exceed the preset threshold value αslip, on the other hand, the CPU 42 determines whether the skid occurrence flag F1 is equal to 1 (step S134) When the skid occurrence flag F1 is equal to 1, the CPU 42 subsequently determines whether the calculated angular acceleration α is negative and whether the negative angular acceleration α has been kept for a preset time period (step S136). When the calculated angular acceleration α is negative and the negative angular acceleration α has been kept for the preset time period, the CPU 42 determines convergence of the skid occurring on the drive wheels 18a and 18b and sets the value '1' to a skid convergence flag F2 (step S138), before exiting from this skid state determination routine. When the angular acceleration α is not negative or when the negative angular acceleration α has not been kept for the preset time period under the setting of the value '1' to the skid occurrence flag F1, the CPU 42 determines no convergence of the skid and terminates this skid state determination routine.

When the calculated angular acceleration α does not exceed the preset threshold value αslip and the skid occurrence flag F1 is not equal to 1, the determination result based on the angular acceleration α shows no occurrence of a skid. The wheel speed difference ΔV calculated at step S106 in the control routine of FIG. 2 is then compared with a preset threshold value Vslip (step S140). When the calculated wheel speed difference ΔV exceeds the preset threshold value Vslip, the CPU 42 determines the occurrence of a minor skid with a slight increase in angular acceleration α and sets the value '1' to a minor skid occurrence flag F3 (step S142), before exiting from this skid state determination routine. When the calculated wheel speed difference ΔV does not exceed the preset threshold value Vslip, on the other hand, the CPU 42 determines whether the minor skid occurrence flag F3 is equal to 1 (step S144). When the minor skid occurrence flag F3 is equal to 1, the CPU 42 determines convergence of the minor skid occurring on the drive wheels 18a and 18b and sets the value '1' to a minor skid convergence flag F4 (step S146), before exiting from this skid state determination routine. The procedure of this embodiment determines the skid state of the drive wheels 18a and 18b based on the wheel speed difference ΔV, since the drive wheels 18a and 18b may have a minor wheelspin under some wear level of wheels and some conditions of the road surface even when the angular acceleration α does not significantly increase to suggest the occurrence of a major skid.

When the wheel speed difference ΔV does not exceed the preset threshold value Vslip and the minor skid occurrence flag F3 is not equal to 1, the CPU 42 determines no occurrence of any skid on the drive wheels 18a and 18b and sets the value '0' to all the flags F1 to F4 (step S148), before exiting from this skid state determination routine.

On completion of the skid state determination routine of FIG. 4, the program returns to the motor drive control routine of FIG. 2 to execute required control according to the determined skid state (steps S112 to S120) and terminates the motor drive control routine. Setting the value '0' to all the flags F1 to F4 suggests no occurrence of any skid and triggers grip control (step S112). Setting the value '1' to the flag F1 and the value '0' to the flag F2 suggests the occurrence of a major skid and triggers skid occurring state control (step S114). Setting the value '1' to both the flags F1 and F2 suggests convergence of the major skid and triggers skid convergence state control (step S116). Setting the value '1' to the flag F3 and the value '0' to the flag F4 suggests the occurrence of a minor skid and triggers minor skid occurring state control (step S118) Setting the value '1' to both the flags F3 and F4 suggests convergence of the minor skid and triggers minor skid convergence state control (step S120). The details of the respective controls are described below.

The grip control is normal drive control of the motor 12 and drives and control the motor 12 to ensure output of a torque corresponding to the preset torque demand Tm*.

Figure 5:
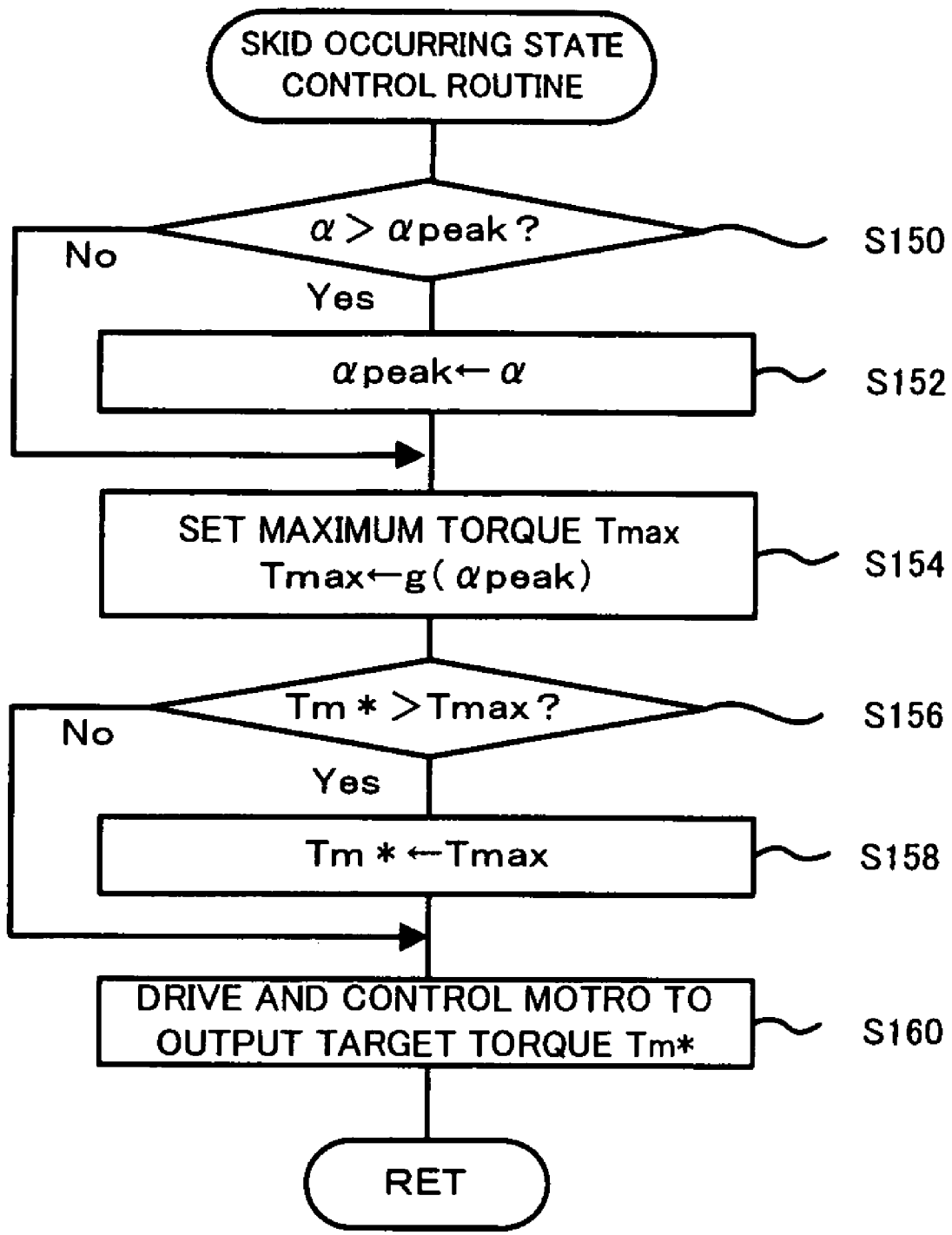
FIG. 5 is a flowchart showing a skid occurring state control routine executed by the electronic control unit 40 in the motor control apparatus 20 of the embodiment.
Figure 6:
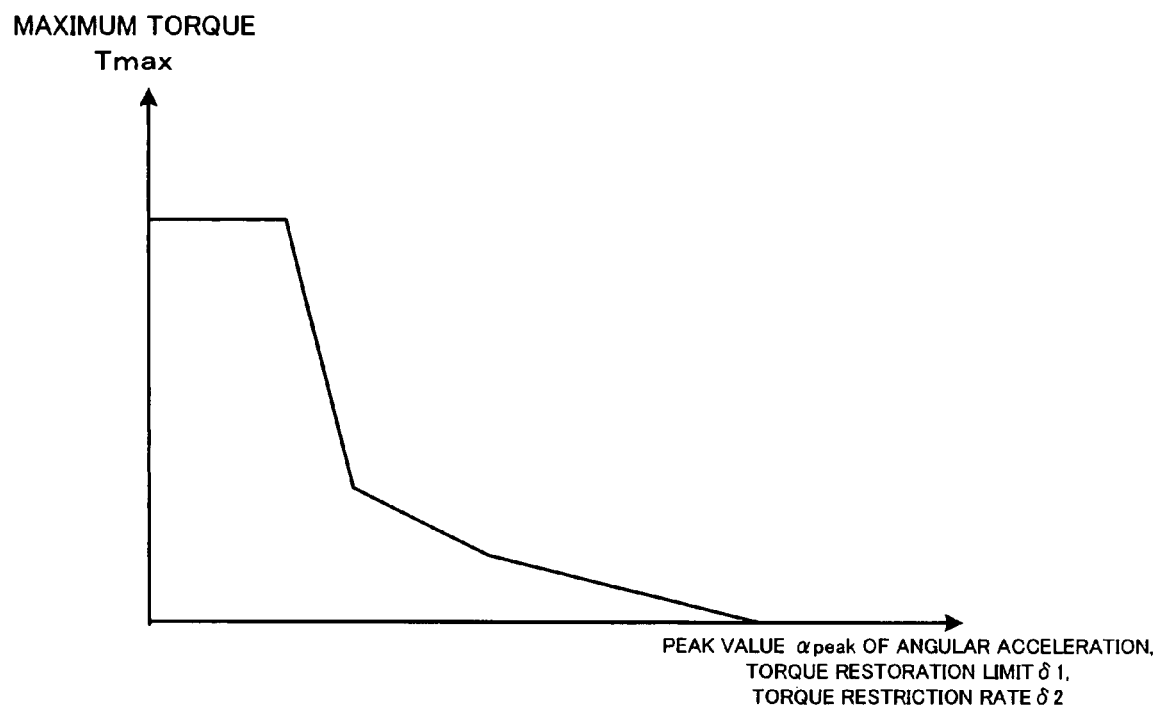
FIG. 6 is a map showing a variation in maximum torque Tmax against angular acceleration α of a motor 12.

The skid occurring state control drives and controls the motor 12 to lower the angular acceleration α increasing by the occurrence of a skid and follows a skid occurring state control routine of FIG. 5. The CPU 42 of the electronic control unit 40 first compares the angular acceleration α with a preset peak value αpeak (step S150). When the angular acceleration α exceeds the preset peak value αpeak, the peak value αpeak is updated to the current value of the angular acceleration α (step S152). The peak value speak represents a peak of the angular acceleration α increasing due to a skid and is initially set equal to 0. Until the angular acceleration α increases to reach its maximum, the peak value αpeak is successively updated to the current value of the angular acceleration α. When the increasing angular acceleration α reaches its maximum, the maximum value of the increasing angular acceleration α is fixed to the peak value αpeak. After setting the peak value αpeak, the CPU 42 sets a maximum torque Tmax as an upper limit of torque output from the motor 12 corresponding to the peak value αpeak (step S154). The procedure of this embodiment refers to a map shown in FIG. 6 to set the maximum torque Tmax. FIG. 6 shows a variation in maximum torque Tmax against the angular acceleration α. As illustrated in this map, the maximum torque Tmax decreases with an increase in angular acceleration α. The greater peak value αpeak with an increase in angular acceleration α, that is, the heavier skid, sets the smaller value to the maximum torque Tmax and limits the output torque of the motor 12 to the smaller maximum torque Tmax.

After setting the maximum torque Tmax, the motor torque demand Tm* is compared with the maximum torque Tmax (step S156). When the motor torque demand Tm* exceeds the maximum torque Tmax, the motor torque demand Tm* is limited to the maximum torque Tmax (step S158). The CPU 42 then sets the motor torque demand Tm* to a target torque and drives and controls the motor 12 to output a torque corresponding to the target torque Tm* (step S160), before exiting from this skid occurring state control routine. The torque output from the motor 12 in the occurrence of a skid is limited to a lower level (that is, the maximum torque Tmax corresponding to the peak value αpeak of the angular acceleration in the map of FIG. 6) for immediate reduction of the skid. This limitation effectively reduces the skid.

Figure 7:
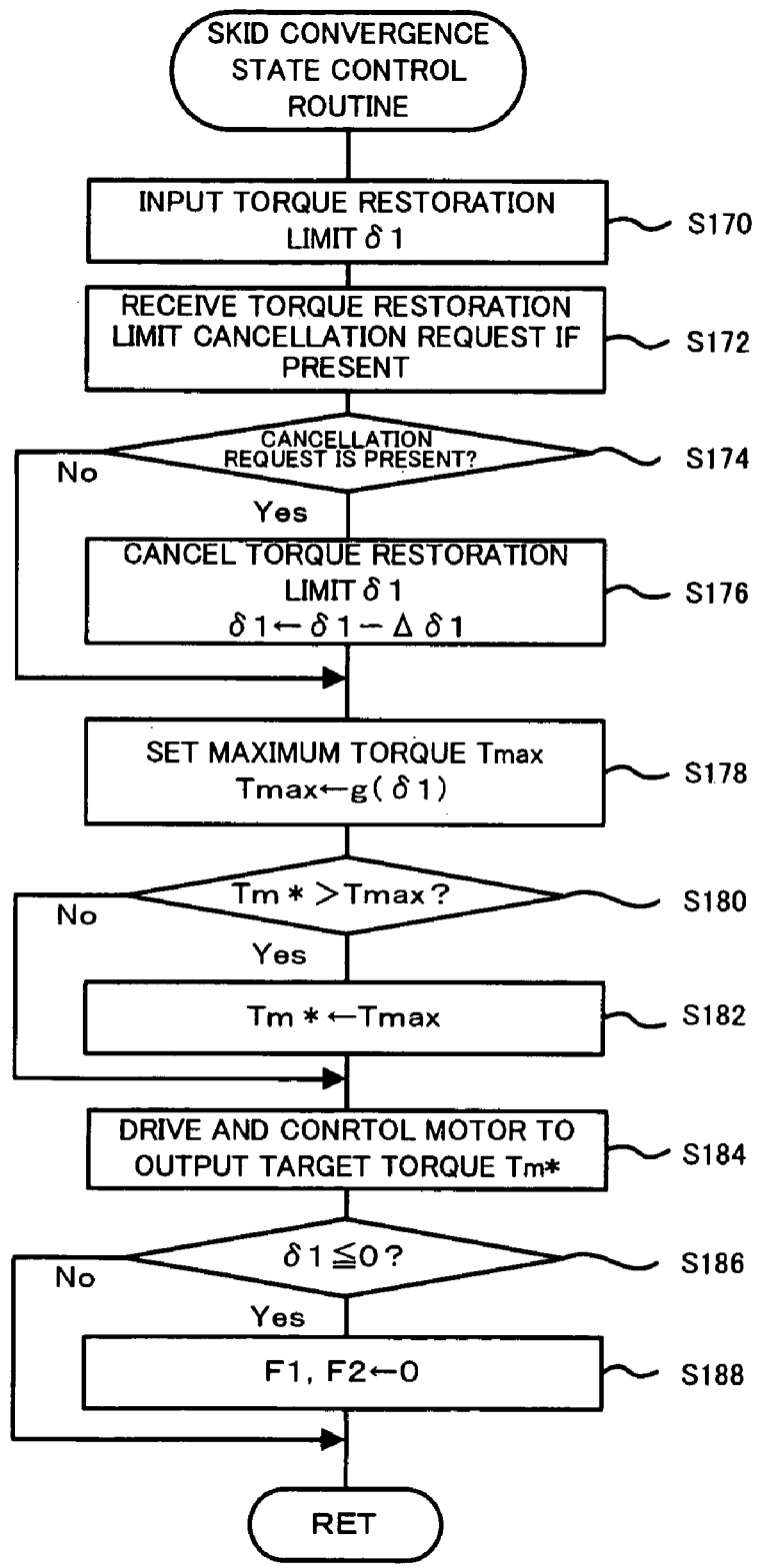
FIG. 7 is a flowchart showing a skid convergence state control routine executed by the electronic control unit 40 in the motor control apparatus 20 of the embodiment.
Figure 8:
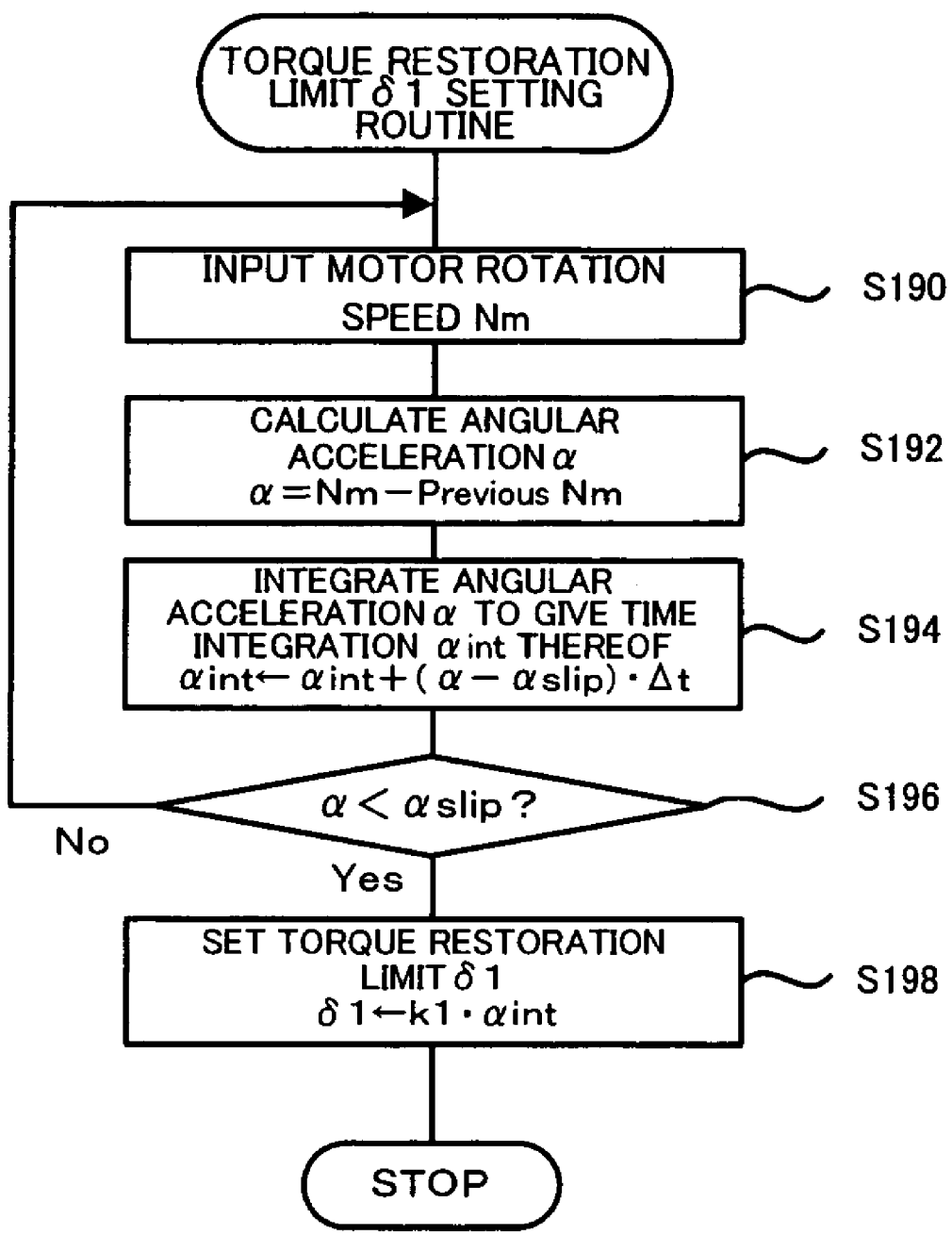
FIG. 8 is a flowchart showing a torque restoration limit δ1 setting routine executed by the electronic control unit 40 in the motor control apparatus 20 of the embodiment.

The skid convergence state control drives and controls the motor 12 to restore the torque level limited in response to the increasing angular acceleration α by the skid occurring state control, and follows a skid convergence state control routine of FIG. 7. The CPU 42 of the electronic control unit 40 first inputs a torque restoration limit δ1 (expressed in the same unit [rpm/8 msec] as the angular acceleration) (step S170) The torque restoration limit δ1 is a parameter used to set a degree of restoration from the torque restriction by increasing the maximum torque Tmax, which has been limited corresponding to the peak value speak of the angular acceleration by the skid occurring state control. The torque restoration limit δ1 is set according to a torque restoration limit δ1 setting routine shown in FIG. 8 as discussed below. The torque restoration limit δ1 setting routine of FIG. 8 is executed when the skid occurrence flag F1 is changed from 0 to 1 (that is, when the calculated angular acceleration α exceeds the preset threshold value αslip) at step S132 in the skid state determination routine of FIG. 4. The CPU 42 of the electronic control unit 40 first inputs the motor rotation speed Nm calculated from the rotation angle θ measured by the rotation angle sensor 22 (step S190) and calculates the angular acceleration α of the motor 12 from the input motor rotation speed Nm (step S192). The CPU 42 then integrates the angular acceleration α to give a time integration αint thereof over an integration interval since the angular acceleration α exceeds the preset threshold value αslip (step S194). In this embodiment, the time integration αint of the angular acceleration α is given by Equation (1) below, where Δt denotes a time interval of the repeated execution of steps S190 to S194 as described below and is set equal to 8 msec in this embodiment:

$$\alpha int \leftarrow \alpha int + (\alpha - \alpha slip) \cdot \Delta t \qquad (1)$$

The processing of steps S190 to S194 is repeated at the time intervals Δt, until the angular acceleration α decreases below the preset threshold value αslip (step S196). Namely the integration interval is between the time point when the angular acceleration α exceeds the threshold value αslip and the time point when the angular acceleration α decreases below the threshold value αslip. The torque restoration limit δ1 is set by multiplying the time integration αint by a predetermined coefficient k1 (step S198). The torque restoration limit δ1 setting routine is here terminated. This routine calculates the torque restoration limit δ1 by multiplication of the predetermined coefficient k1. One modified procedure may prepare in advance a map representing a variation in torque restoration limit δ1 against the time integration αint and read the torque restoration limit δ1 corresponding to the given time integration αint from the map.

On completion of the torque restoration limit δ1 setting routine of FIG. 8, the program returns to the skid convergence state control routine of FIG. 7. After input of the torque restoration limit δ1, the CPU 42 receives a cancellation request of the torque restoration limit δ1 (step S172) if present and determines the presence or the absence of the cancellation request (step S174). This step determines input or non-input of a request for canceling the torque restoration limit δ1, which is the parameter to set the degree of restoration from the torque restriction (a request for gradually increasing the degree of restoration). The procedure of this embodiment receives a cancellation request to cancel the restoration limit with a cancellation rate Δδ1, which is initially set equal to 0 and increments by a preset increment amount every time a preset waiting time interval has elapsed since the first cycle of this routine. The waiting time interval and the increment amount of the cancellation rate Δδ1 may be varied according to the demand level of the driver's cancellation request, for example, according to the magnitude of the accelerator opening representing the driver's torque output demand. In the presence of a cancellation request, the torque restoration limit δ1 is updated by subtracting the cancellation rate Δδ1 from the previous setting of the torque restoration limit δ1 input at step S170 (step S176). In the absence of a cancellation request, that is, when the preset waiting time interval has not yet elapsed since the first cycle of this routine and the cancellation rate Δδ1 is equal to 0, on the other hand, the torque restoration limit δ1 is not updated. The maximum torque Tmax as the upper limit of torque output from the motor 12 is set corresponding to the torque restoration limit δ1 by referring to the map of FIG. 6 (step S178).

After setting the maximum torque Tmax, the motor torque demand Tm* is compared with the preset maximum torque Tmax (step S180). When the motor torque demand Tm* exceeds the maximum torque Tmax, the motor torque demand Tm* is limited to the maximum torque Tmax (step S182). The CPU 42 then sets the motor torque demand Tm* to a target torque and drives and controls the motor 12 to output a torque corresponding to the target torque Tm* (step S184). The torque control of the motor 12 based on the torque restoration limit δ1, which is set corresponding to the time integration of the angular acceleration α, ensures restoration of the restricted torque to an adequate level in response to convergence of a skid according to the current skid state. Under the condition of a large time integration of the angular acceleration α, which suggests a high potential for occurrence of another skid, the torque restoration level is set low in response to convergence of a skid. Under the condition of a small time integration of the angular acceleration α, which suggests a low potential for occurrence of another skid, on the contrary, the torque restoration level is set high to effectively prevent the occurrence of another skid without excessive torque restriction. After the drive control of the motor 12, the CPU 42 determines whether the torque restoration limit δ1 is not higher than 0, that is, whether the torque restoration limit δ1 is completely eliminated (step S186). In the case of complete elimination, both the skid occurrence flag F1 and the skid convergence flag F2 are set equal to zero (step S188). The program then terminates the skid convergence state control routine.

Figure 9:
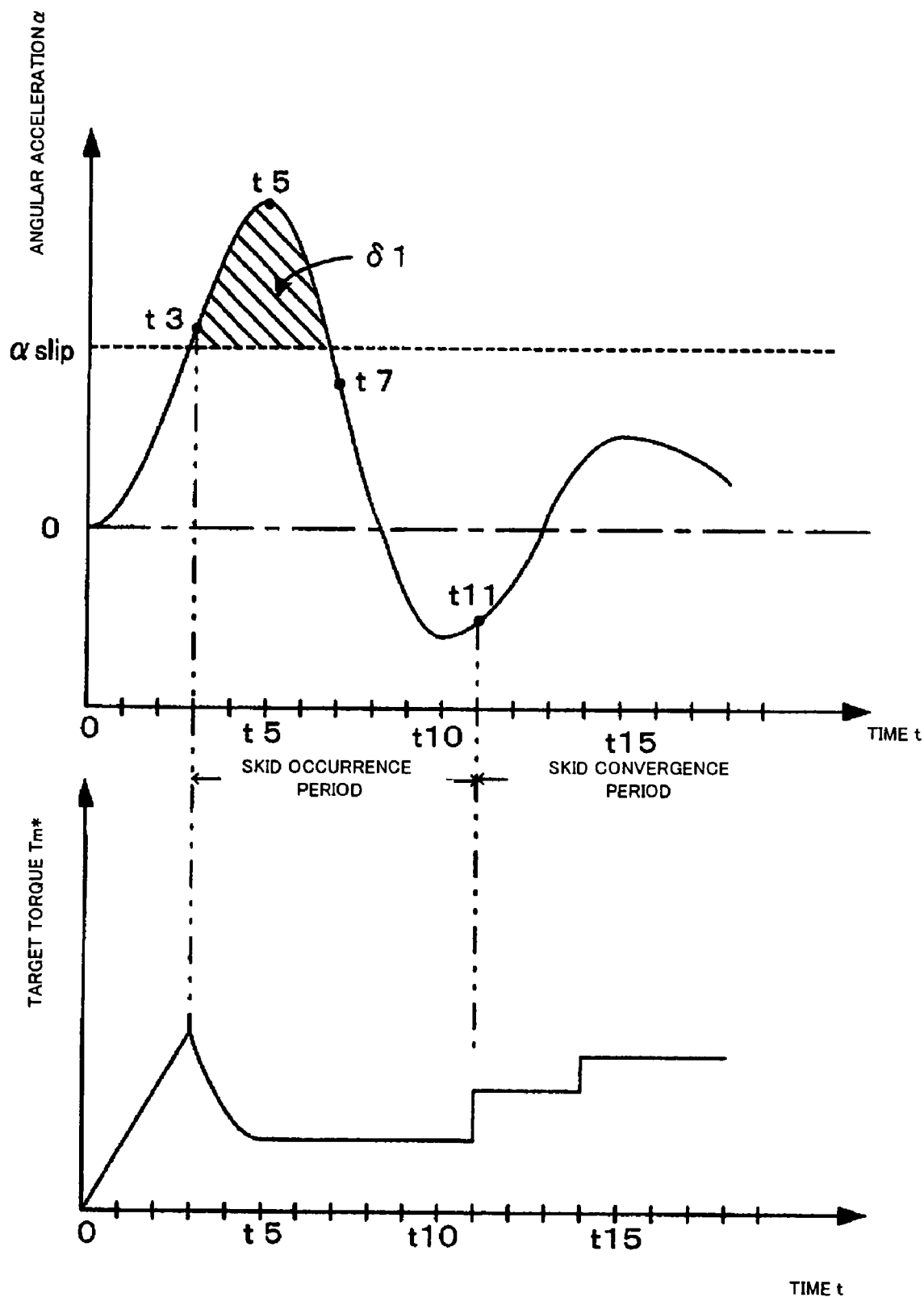
FIG. 9 shows a variation in torque output from the motor 12 with a variation in angular acceleration α of a rotating shaft of the motor 12.

FIG. 9 shows a variation in torque output from the motor 12 with a variation in angular acceleration α of the rotating shaft of the motor 12. FIG. 10 shows settings of the maximum torque Tmax according to the varying angular acceleration α. The abscissa in the graph of FIG. 9 represents the time axis. In the illustrated example of FIG. 9, the angular acceleration α exceeds the preset threshold value αslip at a time point t3. The torque restriction control accordingly starts in response to detection of the occurrence of a skid at this time point t3. The maximum torque Tmax is set equal to a value T3 corresponding to the angular acceleration α at the time point t3 (see FIG. 10(a)). At a time point t5, the angular acceleration α reaches a peak, and the maximum torque Tmax is set equal to a value T5, which is lower than the value T3, corresponding to the peak value αpeak of the angular acceleration α (see FIG. 10(b)). The maximum torque Tmax is fixed to the value T5 until a time point t10. In a skid occurrence period, the output torque from the motor 12 is restricted to a relatively low level corresponding to the maximum torque Tmax as shown in FIG. 9. At a time point t7, the angular acceleration α decreases again below the preset threshold value αslip. The angular acceleration α is integrated over the integration interval between the time point t3 and the time point t7, that is, over the integration interval between the time point when the angular acceleration α exceeds the threshold value αslip and the time point when the angular acceleration α decreases below the threshold value αslip. The toque restoration limit δ1 for restoration of the restricted torque is then set corresponding to the integrated angular acceleration α. After a preset time period has elapsed since the angular acceleration α becomes negative, that is, at a time point t11 in the example of FIG. 9, the torque control assumes convergence of the skid and starts restoration of the restricted torque level. At the time point t11, the maximum torque Tmax is set equal to a value T11, which is higher than the value T5, corresponding to the torque restoration limit δ1 (see FIG. 10(c)). The restricted torque level is restored gradually in response to each cancellation request of the torque restoration limit δ1 input at every elapse of the preset waiting time interval. In response to input of a cancellation request of the torque restoration limit δ1 at a time point t14, the torque restoration limit δ1 is cancelled by the cancellation rate Δδ1, and the maximum torque Tmax is set equal to a value T14, which is higher than the value T11, corresponding to the cancelled level of the torque restoration limit δ1 (see FIG. 10(d)). In a skid convergence period, the output torque from the motor 12 is gradually increased with an increase in setting of the maximum torque Tmax as shown in FIG. 9.

Figure 11:
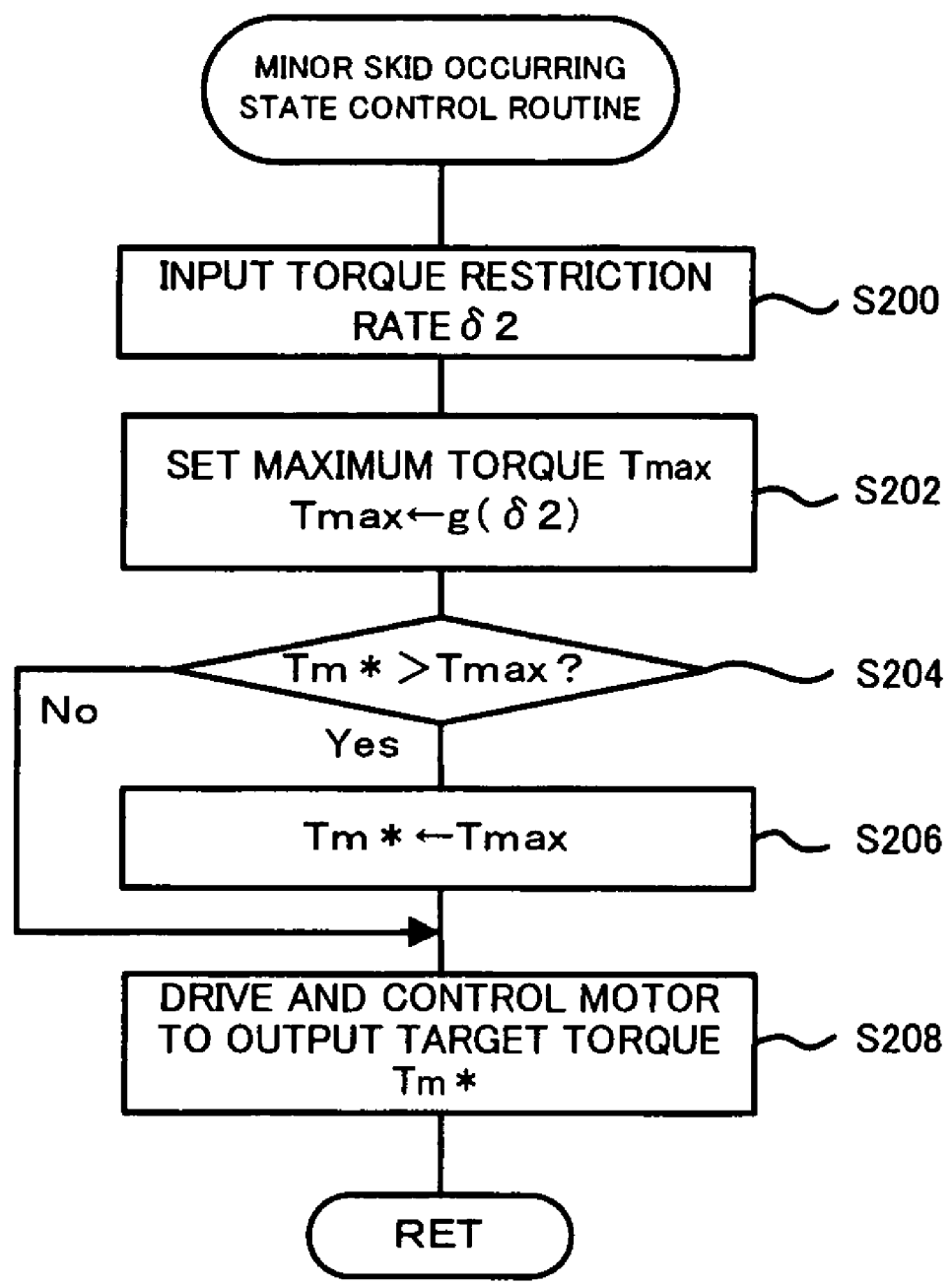
FIG. 11 is a flowchart showing a minor skid occurring state control routine executed by the electronic control unit 40 in the motor control apparatus 20 of the embodiment.
Figure 12:
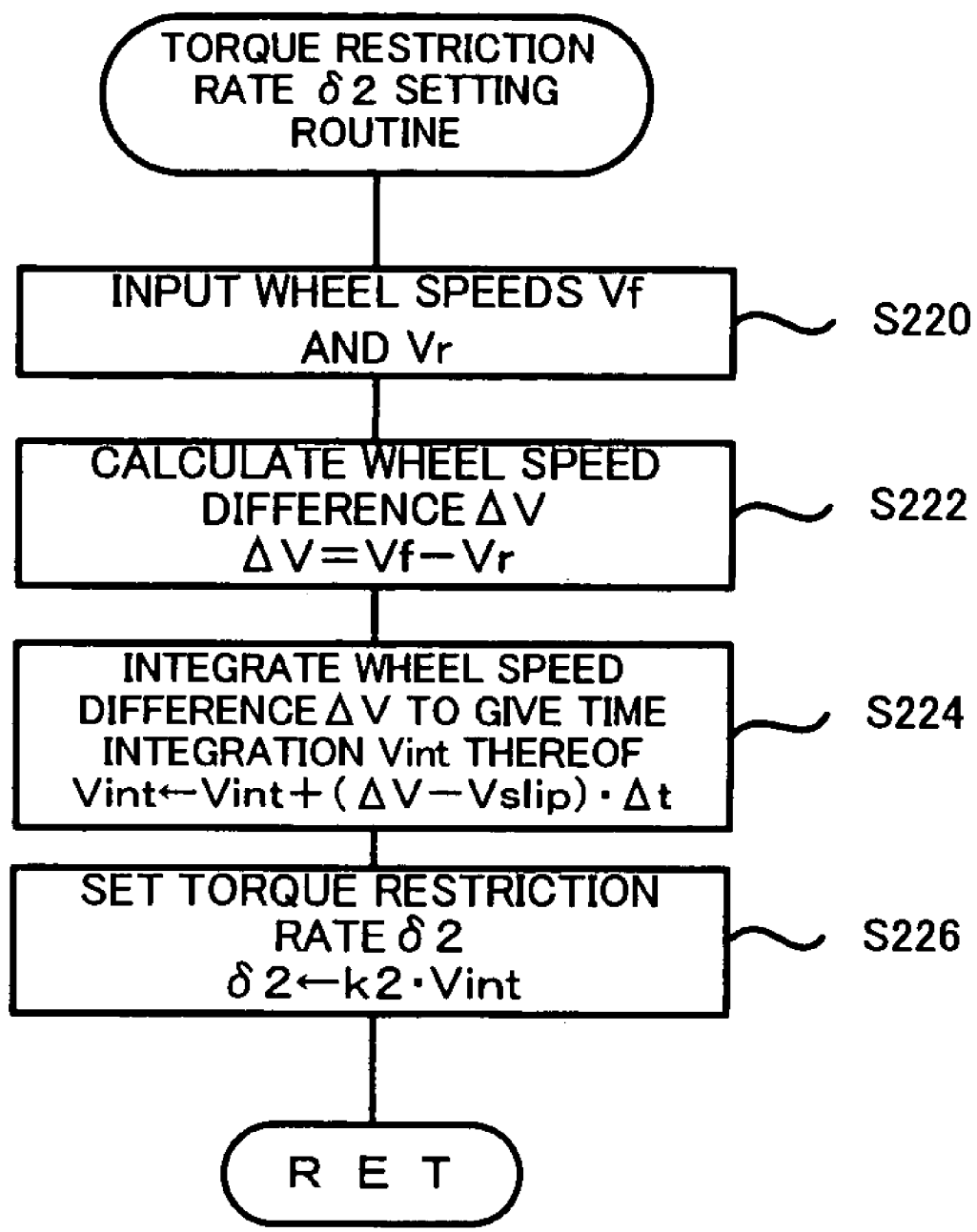
FIG. 12 is a flowchart showing a torque restriction rate δ2 setting routine executed by the electronic control unit 40 in the motor control apparatus 20 of the embodiment.

The minor skid occurring state control drives and controls the motor 12 to lower the wheel speed difference ΔV increasing by the occurrence of a minor skid and follows a minor skid occurring state control routine of FIG. 11. The CPU 42 of the electronic control unit 40 first inputs a torque restriction rate δ2 (step S200). The torque restriction rate δ2 is a parameter used to set the maximum torque Tmax of the motor 12 for elimination of a minor skid. The torque restriction rate δ2 is set according to a torque restriction rate δ2 setting routine shown in FIG. 12 as discussed below. The torque restriction rate δ2 setting routine of FIG. 12 is executed repeatedly at preset time intervals (for example, at every 8 msec) in a time period between a time point when the minor skid occurrence flag F4 is changed from 0 to 1 at step S142 in the skid state determination routine of FIG. 4 and a time point when the minor skid convergence flag F3 is changed from 0 to 1. The torque restriction rate δ2 setting routine first inputs the wheel speeds Vf and Vr (step S220), calculates the wheel speed difference ΔV as a difference between the input wheel speeds Vf and Vr (step S222), and integrates the calculated wheel speed difference ΔV to give a time integration Vint thereof over an integration interval since the wheel speed difference ΔV exceeds the preset threshold value Vslip (step S224). In this embodiment, the time integration Vint of the wheel speed difference ΔV is given by Equation (2) below, where Δt denotes the execution time interval of this routine:

$$Vint \leftarrow Vint + (\Delta V - Vslip) \cdot \Delta t \quad (2)$$

The torque restriction rate δ2 is set by multiplying the time integration Vint of the wheel speed difference ΔV by a predetermined coefficient k2 (step S226). The torque restriction rate δ2 setting routine is here terminated. This routine calculates the torque restriction rate δ2 by multiplication of the predetermined coefficient k2. One modified procedure may prepare in advance a map representing a variation in torque restriction rate δ2 against the time integration Vint and read the torque restriction rate δ2 corresponding to the given time integration Vint from the map.

On completion of the torque restriction rate δ2 setting routine, the program returns to the minor skid occurring state control routine of FIG. 11. The maximum torque Tmax as the upper limit of torque output from the motor 12 is set corresponding to the input torque restriction rate δ2 by referring to the map of FIG. 6 (step S202). After setting the maximum torque Tmax, the motor torque demand Tm* is compared with the maximum torque Tmax (step S204). When the motor torque demand Tm* exceeds the maximum torque Tmax, the motor torque demand Tm* is limited to the maximum torque Tmax (step S206). The CPU 42 then sets the motor torque demand Tm* to a target torque and drives and controls the motor 12 to output a torque corresponding to the target torque Tm* (step S208), before exiting from this minor skid occurring state control routine. The torque output from the motor 12 in the occurrence of a minor skid is limited to a lower level (that is, the maximum torque Tmax corresponding to the torque restriction rate δ2 [rpm/8 msec] in the map of FIG. 6) for immediate reduction of the minor skid. This limitation effectively reduces the minor skid.

Figure 13:
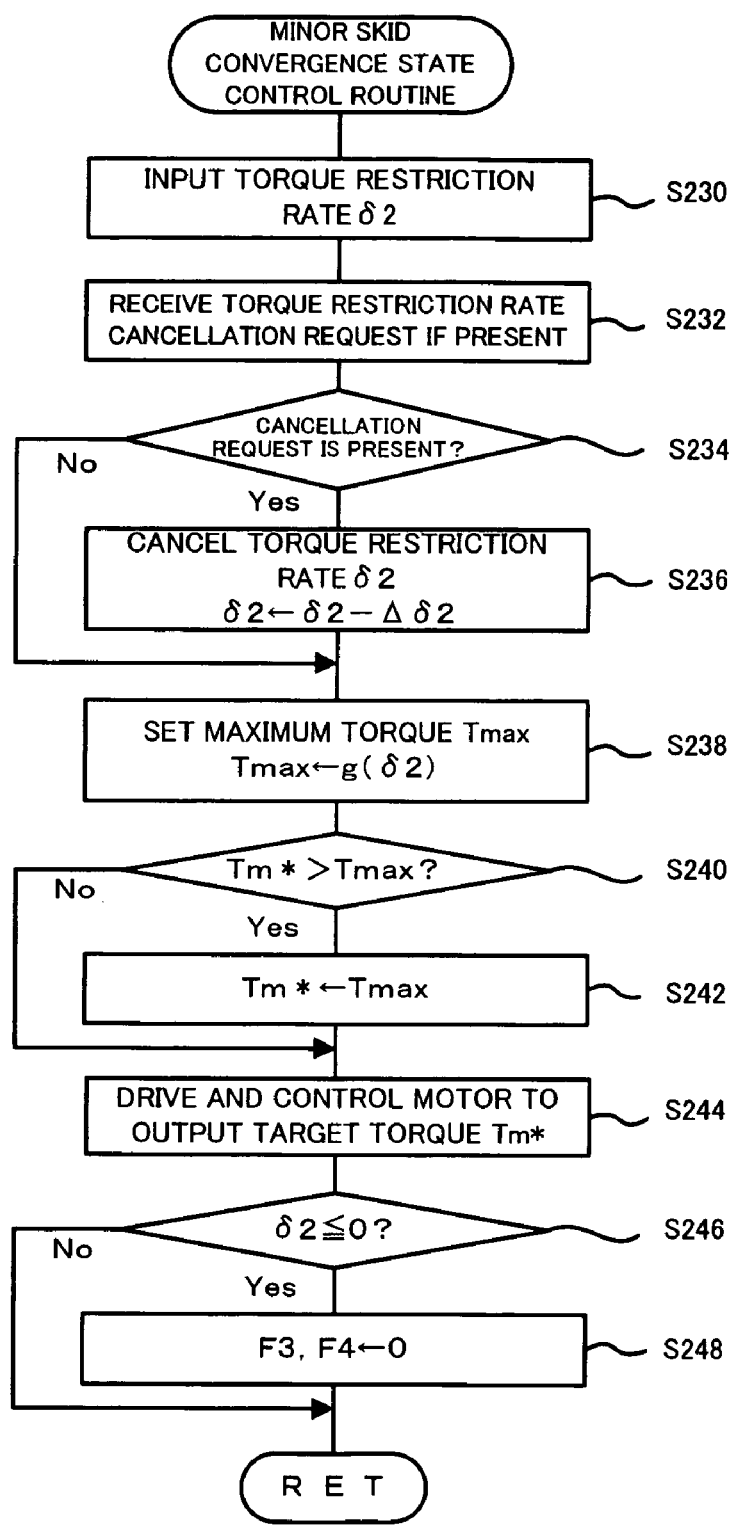
FIG. 13 is a flowchart showing a minor skid convergence state control routine executed by the electronic control unit 40 in the motor control apparatus 20 of the embodiment.

The minor skid convergence state control drives and controls the motor 12 to restore the limited torque level in response to the decreasing wheel speed difference ΔV by the minor skid occurring state control, and follows a minor skid convergence state control routine of FIG. 13. The CPU 42 of the electronic control unit 40 first inputs the last setting of the torque restriction rate δ2, which has been set in the last cycle of the repeatedly executed torque restriction rate δ2 setting routine of FIG. 12 (that is, immediately before the minor skid convergence flag F4 is changed from 0 to 1) (step S230). The CPU 42 receives a cancellation request of the input torque restriction rate δ2 if present (step S232) and determines the presence or the absence of the cancellation request (step S234). This step determines input or non-input of a request for canceling the torque restriction rate δ2, which is the parameter to set the degree of torque restriction. The procedure of this embodiment receives a cancellation request to cancel the torque restriction with a cancellation rate Δδ2, which is initially set equal to 0 and increments by a preset increment amount every time a preset waiting time interval has elapsed since the first cycle of this routine. The waiting time interval and the increment amount of the cancellation rate Δδ2 may be varied according to the demand level of the driver's cancellation request, for example, according to the magnitude of the accelerator opening representing the driver's torque output demand. In the presence of a cancellation request, the torque restriction rate δ2 is updated by subtracting the cancellation rate Δδ2 from the previous setting of the torque restriction rate δ2 input at step S230 (step S236). In the absence of a cancellation request, that is, when the preset waiting time interval has not yet elapsed since the first cycle of this routine and the cancellation rate Δδ2 is equal to 0, on the other hand, the torque restriction rate δ2 is not updated. The maximum torque Tmax as the upper limit of torque output from the motor 12 is set corresponding to the torque restriction rate δ2 by referring to the map of FIG. 6 (step S238). After setting the maximum torque Tmax, the motor torque demand Tm* is compared with the preset maximum torque Tmax (step S240). When the motor torque demand Tm* exceeds the maximum torque Tmax, the motor torque demand Tm* is limited to the maximum torque Tmax (step S242). The CPU 42 then sets the motor torque demand Tm* to a target torque and drives and controls the motor 12 to output a torque corresponding to the target torque Tm* (step S244). The CPU 42 subsequently determines whether the torque restriction rate δ2 is not higher than 0, that is, whether the torque restriction rate δ2 is completely eliminated (step S246) In the case of complete elimination, both the minor skid occurrence flag F3 and the minor skid convergence flag F4 are set equal to zero (step S248). The program then terminates the minor skid convergence state control routine.

Figure 14:
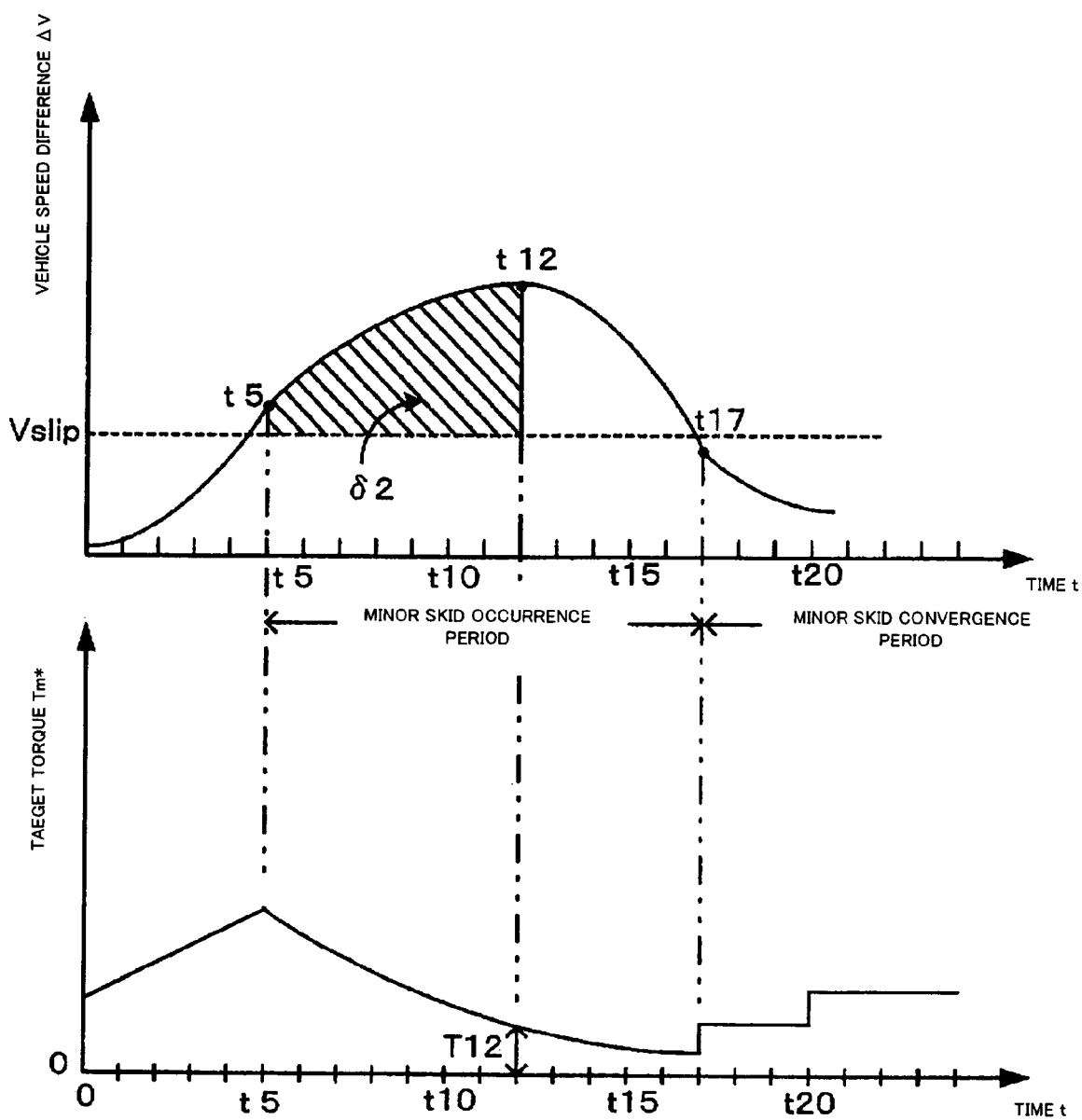
FIG. 14 shows a variation in torque output from the motor 12 with a variation in wheel speed difference ΔV between drive wheels 18a and 18b and driven wheels 19a and 19b.

FIG. 14 shows a variation in torque output from the motor 12 with a variation in wheel speed difference ΔV between the drive wheels 18a and 18b and the driven wheels 19a and 19b. FIG. 15 shows settings of the maximum torque Tmax of the motor 12 against the time integration of the wheel speed difference ΔV. The abscissa in the graph of FIG. 14 represents the time axis. In the illustrated example of FIG. 14, the wheel speed difference ΔV exceeds the preset threshold value Vslip at a time point t5. The torque restriction control accordingly starts in response to detection of the occurrence of a minor skid at this time point t5 (see FIG. 15(a)). The maximum torque Tmax is set corresponding to the torque restriction rate δ2, which depends upon the time integration Vint of the wheel speed difference ΔV over the integration interval between the occurrence time of the minor skid and the current time. The maximum torque Tmax is gradually lowered (from a value T6 to a value T12 and then to a value T17) with an increase in torque restriction rate δ2 until the wheel speed difference ΔV decreases below the preset threshold value Vslip, that is, during a time period between the time point t5 and a time point t17 in the illustrated example of FIG. 14 (see FIGS. 15(b) and 15(c)). In a minor skid occurrence period, the output torque limit from the motor 12 is gradually lowered corresponding to the maximum torque Tmax as shown in FIG. 14. At a time point t18, the wheel speed difference ΔV decreases again below the preset threshold value Vslip. The torque control assumes convergence of the minor skid and starts restoration of the restricted torque level. The restricted torque level is restored gradually in response to each cancellation request of the torque restriction rate δ2 input at every elapse of the preset waiting time interval. The maximum torque Tmax is accordingly changed from the value T17 to a higher value T18 corresponding to the cancelled level of the torque restriction rate δ2. In a minor skid convergence period, the output torque from the motor 12 is gradually increased with an increase in setting of the maximum torque Tmax as shown in FIG. 14.

As described above, the motor control apparatus 20 of the embodiment detects the occurrence of a skid when the angular acceleration α of the rotating shaft of the motor 12 exceeds the preset threshold value αslip, and restricts the torque level output from the motor 12 for immediate reduction of the skid. The motor control apparatus 20 integrates the angular acceleration α to give the time integration αint during the time period when the angular acceleration α once exceeds the preset threshold value αslip and decreases again below the preset threshold value αslip. After the torque restriction converges the skid, the motor control apparatus 20 sets the maximum torque Tmax corresponding to the time integration αint of the angular acceleration α and restores the torque level to the maximum torque Tmax as the upper limit. The restoration degree of the torque level is set according to the time integration αint of the angular acceleration α in the skid occurrence period. This arrangement ensures adequate control of the motor 12 according to the skid state and thereby effectively prevents the occurrence of another skid. The time integration αint of the angular acceleration α reflects the skid state. This arrangement thus effectively prevents the occurrence of another skid without excessive torque restriction. The motor control apparatus 20 also detects the occurrence of a minor skid, based on the difference between the wheel speed Vf of the drive wheels 18a and 18b and the wheel speed Vr of the driven wheels 19a and 19b (wheel speed difference ΔV). In response to detection of the occurrence of a minor skid, the torque level is restricted corresponding to the time integration Vint of the wheel speed difference ΔV during the time period between the detection time of the minor skid and the current time. This arrangement enables detection of a minor skid, which is not detectable by monitoring a variation in angular acceleration α, and, in response to detection of a minor skid, controls the torque level for immediate reduction of the minor skid.

The motor control apparatus 20 of the embodiment detects the occurrence of a minor skid based on the variation in wheel speed difference ΔV, only when the variation in angular acceleration α suggests no occurrence of a major skid. One modified procedure may detect the occurrence of a minor skid based on the variation in wheel speed difference ΔV, in parallel with detection of the occurrence of a major skid based on the variation in angular acceleration α. In the event of detection of either a major skid or a minor skid, this modified procedure executes the torque control according to the control routines of FIGS. 5, 7, and 8 in response to detection of the major skid based on the variation in angular acceleration α, while executing the torque control according to the control routines of FIGS. 11, 12, and 13 in response to detection of the minor skid based on the variation in wheel speed difference ΔV. In the event of detection of both a major skid and a minor skid, the torque control in the skid occurrence period may set the maximum torque Tmax corresponding to the total of the peak value αpeak [rpm/8 msec] of the angular acceleration α set at steps S150 and S152 in the skid occurring state control routine of FIG. 5 and the torque restriction rate δ2 [rpm/8 msec] input at step S200 in the routine of FIG. 11 (Tmax←g(αpeak+δ2)) and control the motor 12 with the maximum torque Tmax. The torque control may alternatively set the maximum torque Tmax corresponding to the greater between the peak value αpeak of the angular acceleration α and the torque restriction rate δ2 and control the motor 12 with the maximum torque Tmax. The torque control in the skid convergence period may set the maximum torque Tmax corresponding to the total of the torque restoration limit δ1 [rpm/8 msec] set at step S178 in the routine of FIG. 7 and the torque restriction rate δ2 set at step S236 in the routine of FIG. 13 and control the motor 12 with the maximum torque Tmax. The torque control may alternatively set the maximum torque Tmax corresponding to the greater between the torque restoration limit δ1 and the torque restriction rate δ2 and control the motor 12 with the maximum torque Tmax. Detection of a minor skid based on the variation in wheel speed difference ΔV may be omitted if not required.

The motor control apparatus 20 of the embodiment integrates the angular acceleration α to give the time integration αint over the integration interval when the angular acceleration α once exceeds the preset threshold value αslip and decreases again below the preset threshold value αslip. One possible modification may integrate the angular acceleration α over another integration interval when the angular acceleration α exceeds the preset threshold value αslip and decreases below zero. Another possible modification may integrate the angular acceleration α over a preset time period since the angular acceleration α exceeds the preset threshold value αslip.

In the motor control apparatus 20 of the embodiment, the skid state determination process of FIG. 4 determines convergence of a skid when the negative angular acceleration α has been kept for the preset time period since detection of the occurrence of the skid based on the variation in angular acceleration α. The convergence of a skid may be determined in response to detection of a reducing tendency of the skid, for example, when the angular acceleration α decreases below the preset threshold value αslip or when the angular acceleration α decrease below zero. The convergence of a skid may otherwise be determined after elapse of a preset time period since the angular acceleration decreases below the preset threshold value αslip.

Figure 16:
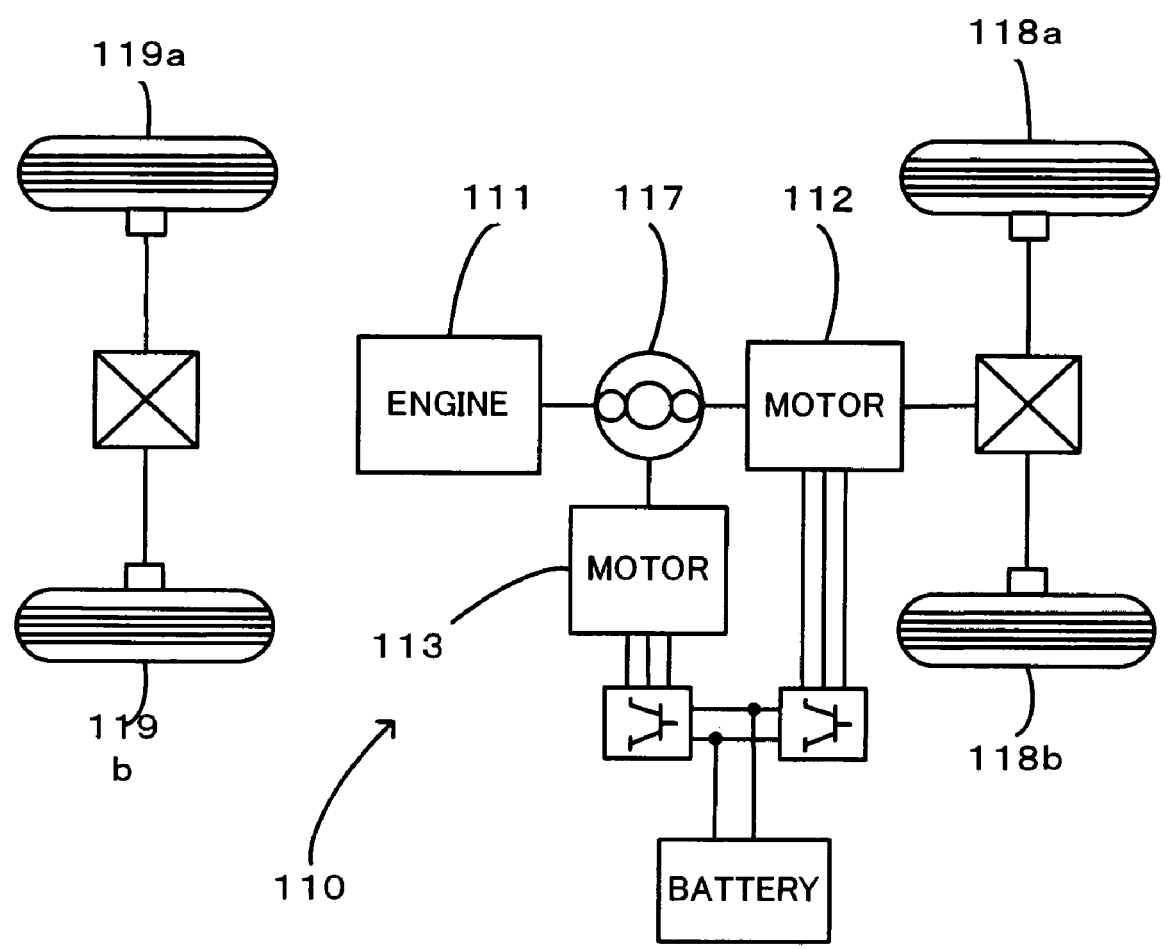
FIG. 16 schematically illustrates the configuration of a hybrid vehicle 110.
Figure 17:
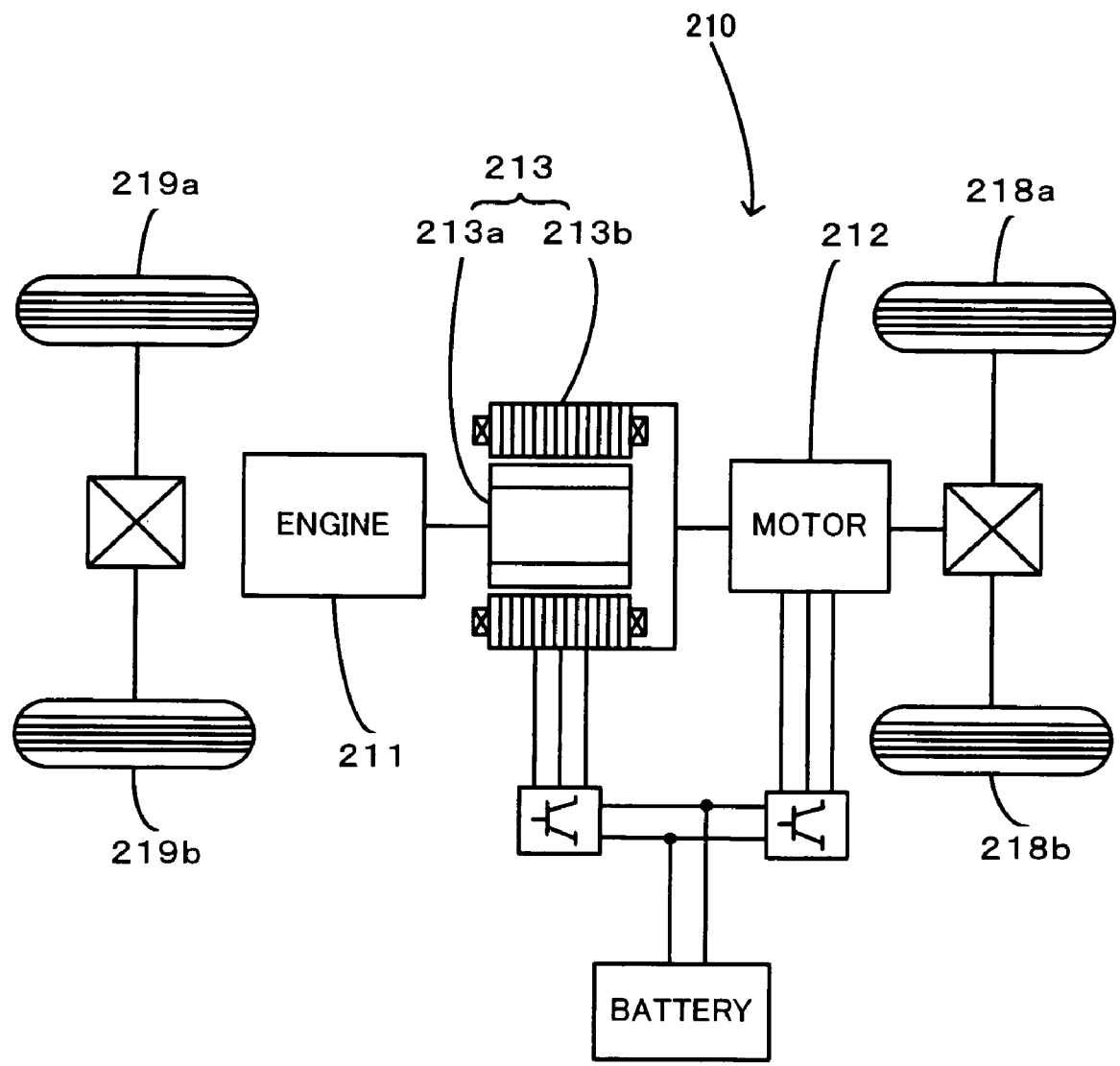
FIG. 17 schematically illustrates the configuration of a hybrid vehicle 210.
Figure 18:
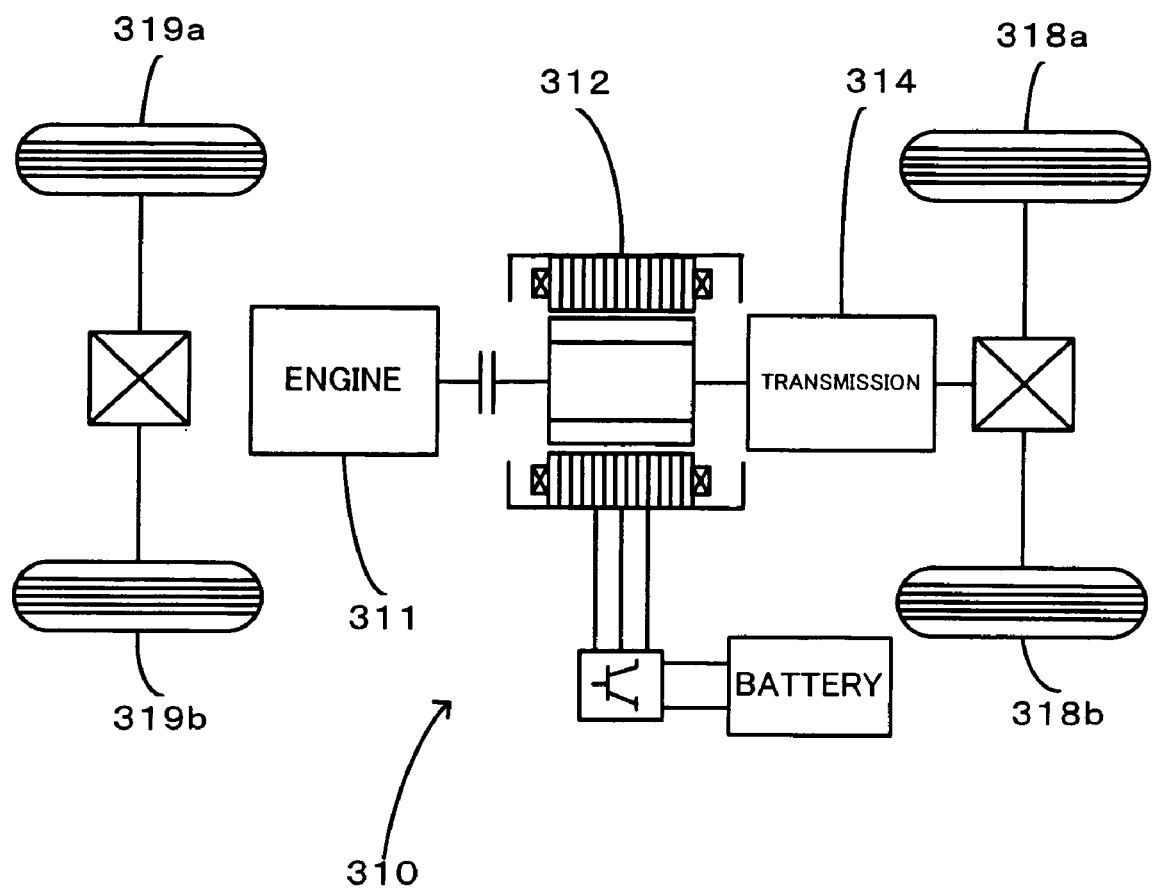
FIG. 18 schematically illustrates the configuration of a hybrid vehicle 310.

The embodiment described above regards control of the motor 12, which is mounted on the vehicle 10 and is mechanically connected with the drive shaft linked to the drive wheels 18a and 18b to directly output power to the drive shaft. The technique of the invention is applicable to a vehicle of any other structure with a motor that is capable of directly outputting power to a drive shaft. For example, one possible application of the invention is a series hybrid vehicle including an engine, a generator that is linked to an output shaft of the engine, a battery that is charged with electric power generated by the generator, and a motor that is mechanically connected with a drive shaft linked to drive wheels and is driven with a supply of electric power from the battery. Another possible application of the invention is a mechanical distribution-type hybrid vehicle 110 including an engine 111, a planetary gear 117 that is connected with the engine 111, a motor 113 that is connected with the planetary gear 117 and is capable of generating electric power, and a motor 112 that is also connected with the planetary gear 117 and is mechanically connected with a drive shaft linked to drive wheels to directly output power to the drive shaft, as shown in FIG. 16. Still another possible application of the invention is an electrical distribution-type hybrid vehicle 210 including a motor 212 that has an inner rotor 213a connected with an output shaft of an engine 211 and an outer rotor 213b connected with a drive shaft linked to drive wheels 218a and 218b and relatively rotates through electromagnetic interactions between the inner rotor 213a and the outer rotor 213b and a motor 212 that is mechanically connected with the drive shaft to directly output power to the drive shaft, as shown in FIG. 17. Another possible application of the invention is a hybrid vehicle 310 including an engine 311 that is connected with a drive shaft linked to drive wheels 318a and 318b via a transmission 314 (for example, a continuous variable transmission or an automatic transmission) and a motor 312 that is placed after the engine 311 and is connected with the drive shaft via the transmission 314 (or a motor that is directly connected with the drive shaft), as shown in FIG. 18. In the event of the occurrence of a skid on drive wheels, the torque control mainly controls the motor mechanically connected with the drive shaft, because of its high torque output response. The control of this motor may be combined with control of the other motor or with control of the engine.

The embodiment and its modified examples discussed above are to be considered in all aspects as illustrative and not restrictive. There may be many other modifications, changes, and alterations without departing from the scope or spirit of the main characteristics of the present invention.

INDUSTRIAL APPLICABILITY

The technique of the invention is effectively applied to automobile and train-related industries.

The invetion claimed is:

1. A motor control apparatus that drives and controls a motor, which is mounted on a vehicle and outputs power to a drive shaft linked to drive wheels, said motor control apparatus comprising:
    an angular acceleration measurement module that measures an angular acceleration of either of said drive shaft and a rotating shaft of said motor;
    a first skid detection module that detects a skid due to wheel spin of the drive wheels, based on the measured angular acceleration;
    a first torque restriction control module that, in response to detection of a skid by said first skid detection module, restricts torque output and controls said motor with the restricted torque output, so as to reduce the skid;
    a first integration module that integrates the angular acceleration, which is measured by said angular acceleration measurement module, to give a time integration thereof since detection of the skid by said first skid detection module; and
    a first torque restoration control module that, in response to at least a reducing tendency of the skid, restores the torque output, which is restricted by said first torque restriction control module, according to the time integration of the angular acceleration given by said first integration module and controls said motor with the restored torque output.

2. A motor control apparatus in accordance with claim 1, wherein said first skid detection module compares the angular acceleration measured by said angular acceleration measurement module with a preset threshold value to detect a skid, and said first integration module integrates the angular acceleration over an integration interval when the measured angular acceleration once exceeds the preset threshold value and decreases again below the preset threshold value.

3. A motor control apparatus in accordance with claim 1, wherein said first torque restoration control module varies a degree of restoration of the restricted torque output according to the time integration of the angular acceleration and controls said motor with the varied degree of the restored torque output.

4. A motor control apparatus in accordance with claim 3, wherein said first torque restoration control module controls said motor with a lower degree of restoration of the restricted torque output against an increase in time integration of the angular acceleration.

5. A motor control apparatus in accordance with claim 3, wherein said first torque restoration control module sets a maximum torque in restoration of the restricted torque output based on the time integration of the angular acceleration and controls said motor with the setting of the maximum torque as an upper limit.

6. A motor control apparatus in accordance with claim 1, wherein said first torque restoration control module restores the restricted torque output, in response to continuous measurement of a negative level of the angular acceleration for a preset time period by said angular acceleration measurement module, and controls said motor with the restored torque output.

7. A motor control apparatus in accordance with claim 1, wherein said first torque restriction control module varies a degree of restriction of the torque output according to the measured angular acceleration and controls said motor with the varied degree of the restricted torque output.

8. A motor control apparatus in accordance with claim 7, wherein said first torque restriction control module controls said motor with a higher degree of restriction of the torque output against an increase in measured angular acceleration.

9. A motor control apparatus in accordance with claim 7, wherein said first torque restriction control module sets a maximum torque in restriction of the torque output based on the measured angular acceleration and controls said motor with the setting of the maximum torque as an upper limit.

10. A motor control apparatus in accordance with claim 1, wherein said vehicle has driven wheels that are driven by the drive wheels, said motor control apparatus further comprising:
a drive wheel rotation speed measurement module that measures a rotation speed of the drive wheels;
a driven wheel rotation speed measurement module that measures a rotation speed of the driven wheels;
a second skid detection module that detects a skid due to wheel spin of the drive wheels, based on a wheel speed difference between the measured rotation speed of the drive wheels and the measured rotation speed of the driven wheels; and
a second torque restriction control module that, in response to detection of a skid by said second skid detection module, restricts the torque output and controls said motor with the restricted torque output, so as to reduce the skid.

11. A motor control apparatus in accordance with claim 10, said motor control apparatus further comprising:
a second integration module that integrates the wheel speed difference between the measured rotation speed of the drive wheels and the measured rotation speed of the driven wheels to give a time integration thereof since detection of the skid by said second skid detection module,
wherein said second torque restriction control module restricts the torque output according to the time integration of the wheel speed difference and controls said motor with the restricted torque output.

12. A motor control apparatus in accordance with claim 11, wherein said second skid detection module compares the wheel speed difference with a preset threshold value to detect a skid, and said second torque restriction control module restricts the torque output according to the time integration of the wheel speed difference since an increase in wheel speed difference over the preset threshold value and controls said motor with the restricted torque output.

13. A motor control apparatus in accordance with claim 11, wherein said second torque restriction control module varies a degree of restriction of the torque output according to the time integration of the wheel speed difference and controls said motor with the varied degree of the restricted torque output.

14. A motor control apparatus in accordance with claim 13, wherein said second torque restriction control module controls said motor with a higher degree of restriction of the torque output against an increase in time integration of the wheel speed difference.

15. A motor control apparatus in accordance with claim 12, said motor control apparatus further comprising:
a second torque restoration control module that, when a result of the comparison by said second skid detection module shows that the wheel speed difference decreases below the preset threshold value, restores the torque output restricted by said second torque restriction control module and controls said motor with the restored torque output.

16. A vehicle equipped with a motor and a motor control apparatus in accordance with claim 1.

17. A motor control method that drives and controls a motor, which is mounted on a vehicle and outputs power to a drive shaft linked to drive wheels, said motor control method comprising the steps of:
(a) measuring an angular acceleration of either of said drive shaft and a rotating shaft of said motor;
(b) detecting a skid due to wheel spin of the drive wheels, based on the measured angular acceleration;
(c) in response to detection of a skid by said step (b), restricting torque output and controlling said motor with the restricted torque output so as to reduce the skid;
(d) integrating the angular acceleration, which is measured by said step (a), to give a time integration thereof since detection of the skid by said step (b); and
(e) in response to at least a reducing tendency of the skid, restoring the torque output, which is restricted by said step (c), according to the time integration of the angular acceleration given by said step (d) and controlling said motor with the restored torque output.

18. A motor control method in accordance with claim 17, wherein said step (b) compares the angular acceleration measured by said step (a) with a preset threshold value to detect a skid, and said step (d) integrates the angular acceleration over an integration interval when the measured angular acceleration once exceeds the preset threshold value and decreases again below the preset threshold value.

19. A motor control method in accordance with claim 17, wherein said step (e) varies a degree of restoration of the torque output restricted by said step (c) according to the time integration of the angular acceleration and controls said motor with the varied degree of the restored torque output.

20. A motor control method in accordance with claim 19, wherein said step (e) controls said motor with a lower degree of restoration of the restricted torque output against an increase in time integration of the angular acceleration.

21. A motor control method in accordance with claim 19, wherein said step (e) sets a maximum torque in restoration of the restricted torque output based on the time integration of the angular acceleration and controls said motor with the setting of the maximum torque as an upper limit.

22. A motor control method in accordance with claim 17, wherein said step (e) restores the restricted torque output, in response to continuous measurement of a negative level of the angular acceleration for a preset time period by said step (a), and controls said motor with the restored torque output.

* * * * *

UNITED STATES PATENT AND TRADEMARK OFFICE
CERTIFICATE OF CORRECTION

PATENT NO. : 7,091,678 B2
APPLICATION NO. : 10/525870
DATED : August 15, 2006
INVENTOR(S) : Akira Hommi et al.

It is certified that error appears in the above-identified patent and that said Letters Patent is hereby corrected as shown below:

| Column | Line | |
|---|---|---|
| 1 | 23 | Change "wheelspin" to --wheel spin--. |
| 1 | 62 | Before "the drive shaft" delete "of"; change "and" to --or--. |
| 1 | 63 | Change "wheelspin" to --wheel spin--. |
| 3 | 33 | Change "wheelspin" to --wheel spin--. |
| 4 | 32 | Change "wheelspin" to --wheel spin--. |
| 5 | 19 | Change "toque"to --torque--. |
| 6 | 55 | Change "wheelspin" to --wheel spin--. |
| 7 | 55 | Change wheelspin" to --wheel spin--. |
| 9 | 1 | Before "normal" insert --a--. |
| 9 | 2 | Change "control" to --controls--. |
| 9 | 12 | Change "speak" to --αpeak--. |
| 9 | 57 | Change "speak' to --αpeak--. |
| 16 | 43 | Change "invetion" to --invention--. |
| 16 | 49 | After "either" delete "of". |

UNITED STATES PATENT AND TRADEMARK OFFICE
CERTIFICATE OF CORRECTION

PATENT NO.        : 7,091,678 B2
APPLICATION NO. : 10/525870
DATED             : August 15, 2006
INVENTOR(S)       : Akira Hommi et al.

It is certified that error appears in the above-identified patent and that said Letters Patent is hereby corrected as shown below:

| Column | Line | |
|--------|------|---|
| 16 | 50 | Change "shaft and" to --shaft or--. |
| 18 | 52 | After "either" delete "of". |
| 18 | 53 | Change "shaft and" to --shaft or--. |

Signed and Sealed this

Fifth Day of December, 2006

JON W. DUDAS
*Director of the United States Patent and Trademark Office*